(12) United States Patent
Barkhouse et al.

(10) Patent No.: US 9,289,096 B2
(45) Date of Patent: Mar. 22, 2016

(54) TEMPERATURE CONTROL DEVICE AND METHOD

(75) Inventors: Sydney Barkhouse, Mississauga (CA); Stuart T. McKenzie, Wyevale (CA)

(73) Assignee: WOLFEDALE ENGINEERING LIMITED, Brampton (CA)

(*) Notice: Subject to any disclaimer, the term of this patent is extended or adjusted under 35 U.S.C. 154(b) by 1408 days.

(21) Appl. No.: 12/271,905

(22) Filed: Nov. 16, 2008

(65) Prior Publication Data
US 2009/0183729 A1 Jul. 23, 2009

Related U.S. Application Data

(63) Continuation-in-part of application No. 12/000,163, filed on Dec. 10, 2007, now Pat. No. 7,793,649.

(30) Foreign Application Priority Data

Nov. 16, 2007 (WO) ................ PCT/CA2007/002085
Dec. 10, 2007 (CA) ..................................... 2613858

(51) Int. Cl.
*A47J 37/07* (2006.01)
*A47J 27/62* (2006.01)
(Continued)

(52) U.S. Cl.
CPC .............. *A47J 37/0713* (2013.01); *A47J 27/62* (2013.01); *A47J 37/0786* (2013.01); *F23N 1/002* (2013.01);
(Continued)

(58) Field of Classification Search
CPC ... A47J 37/0713; A47J 37/0786; A47J 27/62; G05D 23/1919; G05D 23/22
USPC ...... 126/42, 39 G, 39 R, 39 BA, 41 R, 351.1, 126/374.1, 502
See application file for complete search history.

(56) References Cited

U.S. PATENT DOCUMENTS 18,271 A * 9/1857 Bate ............................ 126/374.1
40,773 A * 12/1863 Singer ......................... 126/39 R
(Continued)

FOREIGN PATENT DOCUMENTS

CA 2088407 7/1994
JP 60082726 A * 5/1985
(Continued)

OTHER PUBLICATIONS

Australian Patent Office; Patent Examination Report No. 1 dated Jul. 13, 2012 issued in corresponding 2007361169; 4 pages.
(Continued)

*Primary Examiner* — Gregory Huson
*Assistant Examiner* — Daniel E Namay
(74) *Attorney, Agent, or Firm* — Norton Rose Fulbright Canada LLP; Christopher N. Hunter

(57) ABSTRACT

A temperature control system for safely controlling the rate of flow of a flammable fluid at generally constant pressure is disclosed. The system may include a flow control apparatus that is free of a regulator mechanism, for affecting the flow of the fluid. The flow control apparatus may be operable between at least a first flow rate and a second flow rate, and may have at least one upstream opening and at least one downstream opening. The system may also include a first burner in fluid communication with the downstream opening of the flow control apparatus and a conduit in fluid communication at one end thereof with the upstream opening of the flow control apparatus, and configured at the other end thereof for connection to a fuel supply. A thermocouple may be located in the vicinity of the burner or an appliance used in conjunction with the burner. The thermocouple converts a sensed thermal state into an electrical signal. An electronic controller, in communication with the flow control apparatus, for activating the flow control apparatus to one of said first and second flow rates, and being in communication with the thermocouple for receiving the electrical signal from the thermocouple is also provided. An interface connected to the controller for manually inputting a desired temperature may be included, wherein the controller is operable to automatically cycle the flow control apparatus between the first and second flow rates until the temperature sensed by the thermocouple is similar to the desired temperature.

10 Claims, 27 Drawing Sheets

(51) Int. Cl.
*F23N 5/10* (2006.01)
*G05D 23/19* (2006.01)
*G05D 23/22* (2006.01)
*F23N 1/00* (2006.01)
*A47J 36/32* (2006.01)

(52) U.S. Cl.
CPC ............ *F23N 5/102* (2013.01); *G05D 23/1919* (2013.01); *G05D 23/22* (2013.01); *A47J 36/32* (2013.01); *F23N 2037/10* (2013.01); *F23N 2041/08* (2013.01)

(56) References Cited

U.S. PATENT DOCUMENTS

| | | | | |
|---|---|---|---|---|
| 46,045 A * | 1/1865 | Ambrose | .................. | 126/39 R |
| 70,207 A * | 10/1867 | Haskins | .................. | 126/39 R |
| 908,907 A * | 1/1909 | Trescott | .................. | 426/509 |
| 919,843 A * | 4/1909 | Fish | .................. | 219/433 |
| 1,014,421 A * | 1/1912 | Street et al. | .................. | 126/39 R |
| 1,102,796 A * | 7/1914 | Phillips | .................. | 126/39 R |
| 1,161,522 A * | 11/1915 | Phillips | .................. | F24C 3/085 |
| | | | | 126/39 F |
| 1,161,523 A * | 11/1915 | Phillips | .................. | F24C 3/085 |
| | | | | 126/39 F |
| 1,230,296 A * | 6/1917 | Hildebrand | .................. | 126/42 |
| 1,231,402 A * | 6/1917 | Malcamp | .................. | 126/42 |
| 1,290,378 A * | 1/1919 | Sibley | .................. | 220/573.4 |
| 1,438,023 A * | 12/1922 | Dudgeon | .................. | 126/39 G |
| 1,679,937 A * | 8/1928 | Grady | .................. | F24C 3/027 |
| | | | | 126/345 |
| 1,882,247 A * | 10/1932 | Levings | .................. | A47J 31/007 |
| | | | | 126/374.1 |
| 1,945,390 A * | 1/1934 | Baker | .................. | 236/20 R |
| 1,996,434 A * | 4/1935 | O'Dowd | .................. | 99/408 |
| 2,051,401 A * | 8/1936 | Winterstein | .................. | G05D 23/12 |
| | | | | 126/39 E |
| 2,177,193 A * | 10/1939 | Watts | .................. | 99/408 |
| 2,641,314 A * | 6/1953 | Douvan | .................. | 126/42 |
| 2,757,869 A * | 8/1956 | Ray | .................. | 236/20 R |
| 3,683,791 A | 8/1972 | Rast et al. | | |
| 3,912,913 A | 10/1975 | Bunting | | |
| 4,391,265 A * | 7/1983 | Chen | .................. | F23N 1/005 |
| | | | | 126/39 E |
| 4,521,183 A | 6/1985 | Hirai et al. | | |
| 4,599,990 A * | 7/1986 | Fritzsche et al. | .................. | 126/374.1 |
| 4,705,020 A * | 11/1987 | Hahn | .................. | 126/41 R |
| 4,705,021 A * | 11/1987 | Beach | .................. | A47J 37/0682 |
| | | | | 126/39 E |
| 4,817,582 A | 4/1989 | Oslin et al. | | |
| 4,858,119 A | 8/1989 | Waugh et al. | | |
| 4,927,998 A | 5/1990 | Tamura et al. | | |
| 4,994,652 A * | 2/1991 | Wolf | .................. | A47J 27/62 |
| | | | | 219/483 |
| 5,054,465 A * | 10/1991 | Chern | .................. | F24C 15/10 |
| | | | | 126/39 BA |
| 5,163,358 A | 11/1992 | Hanagan et al. | | |
| 5,167,216 A * | 12/1992 | Yeung et al. | .................. | 126/349 |
| 5,313,876 A * | 5/1994 | Hilger et al. | .................. | 99/330 |
| 5,519,644 A | 5/1996 | Benton | | |
| 5,522,541 A | 6/1996 | Zia et al. | | |
| 5,549,038 A * | 8/1996 | Kolvites | .................. | 99/330 |
| 5,640,946 A * | 6/1997 | Oslin | .................. | 126/20 |
| 5,813,320 A * | 9/1998 | Frasnetti et al. | .................. | 99/333 |
| 5,816,235 A | 10/1998 | Kim | | |
| 5,865,164 A * | 2/1999 | Garceau | .................. | F24C 3/12 |
| | | | | 126/39 G |
| 5,910,206 A * | 6/1999 | McNamara | .................. | 99/330 |
| 5,988,155 A * | 11/1999 | Garceau et al. | .................. | 126/39 G |
| 6,142,143 A * | 11/2000 | Martin | .................. | 126/506 |
| 6,155,341 A | 12/2000 | Thompson et al. | | |
| 6,595,112 B2 * | 7/2003 | Durth | .................. | 99/330 |
| 6,663,009 B1 * | 12/2003 | Bedetti et al. | .................. | 236/20 A |
| 6,881,055 B2 | 4/2005 | Bird | | |
| 6,923,204 B2 | 8/2005 | Dalton et al. | | |
| 6,964,273 B1 * | 11/2005 | Bourgeois | .................. | F24C 3/14 |
| | | | | 126/2 |
| 7,231,917 B2 * | 6/2007 | Frederiksen | .................. | 126/39 G |
| 7,777,158 B2 * | 8/2010 | Saltenis et al. | .................. | 219/401 |
| 7,793,649 B2 * | 9/2010 | Barkhouse | .................. | F23N 1/002 |
| | | | | 126/19 R |
| 7,950,920 B2 * | 5/2011 | Vale | .................. | 431/88 |
| 7,980,171 B2 * | 7/2011 | Groll | .................. | A47J 37/067 |
| | | | | 126/374.1 |
| 2003/0155349 A1 | 8/2003 | Matsuo et al. | | |
| 2003/0218002 A1 | 11/2003 | Fulton | | |
| 2005/0098169 A1 * | 5/2005 | Frederiksen | .................. | 126/41 R |
| 2005/0115559 A1 * | 6/2005 | Hwang | .................. | 126/369 |
| 2005/0229918 A1 * | 10/2005 | Shim | .................. | 126/39 BA |
| 2006/0107943 A1 * | 5/2006 | Saksena | .................. | 126/348 |
| 2007/0048683 A1 | 3/2007 | Huff | | |
| 2007/0204858 A1 | 9/2007 | Abelbeck | | |
| 2008/0078376 A1 * | 4/2008 | Wu et al. | .................. | 126/39 BA |
| 2011/0083663 A1 * | 4/2011 | Baier et al. | .................. | 126/39 BA |

FOREIGN PATENT DOCUMENTS

| | | | | |
|---|---|---|---|---|
| JP | 02118321 A * | 5/1990 | | |
| JP | H02230022 | 9/1990 | | |
| JP | 03140711 A * | 6/1991 | | |
| JP | 03272718 A * | 12/1991 | | |
| JP | 05141663 A * | 6/1993 | | |
| JP | 05168392 A | 7/1993 | | |
| JP | 06101842 A * | 4/1994 | | |
| JP | 06272865 A * | 9/1994 | | |
| JP | 1176048 A | 3/1999 | | |
| WO | WO 2006/079881 | 8/2006 | | |
| WO | WO 2006079881 A1 * | 8/2006 | ............. | F23D 11/36 |
| WO | WO 2007/100611 | 9/2007 | | |

OTHER PUBLICATIONS

Canadian Intellectual Property Office; Examiner's Requisition dated Feb. 22, 2012 issued in corresponding Canadian Patent Application No. 2,613,858; 3 pages.
Canadian Intellectual Property Office; Examiner's Requisition dated Feb. 22, 2012 issued in corresponding Canadian Patent Application No. 2,643,957; 3 pages.
Canadian Intellectual Property Office; Examiner's Requisition dated Jan. 16, 2013 issued in corresponding Canadian Patent Application No. 2,643,957; 4 pages.
Canadian Intellectual Property Office; Examiner's Requisition dated Dec. 30, 2014 issued in corresponding Canadian Patent Application No. 2,643,957; 6 pages.
Canadian Intellectual Property Office; Examiner's Requisition dated Jul. 24, 2014 issued in corresponding Canadian Patent Application No. 2,705,861; 2 pages.
Canadian Intellectual Property Office; Examiner's Requisition dated Dec. 16, 2013 issued in corresponding Canadian Patent Application No. 2,705,961; 3 pages.
European Patent Office; Communication pursuant to Article 94(3) EPC issued in corresponding European Patent Application No. 07845555.7; 4 pages.
European Patent Office; European Search Report dated Jun. 15, 2011 issued in corresponding European Patent Application No. 07845555.7; 7 pages.
ISA/CA; Canadian Intellectual Property Office; International Search Report and Written Opinion dated Aug. 18, 2008 issued in corresponding International Application No. PCT/CA2007/002085; 12 pages.
United States Patent and Trade Mark Office; Office Action dated Jun. 23, 2009 issued in corresponding U.S. Appl. No. 12/000,163; 30 pages.
Information Disclosure Statement; List of References cited by Applicant and considered by Examiner on May 14, 2014; 3 pages.
United States Patent and Trade Mark Office; Office Action dated Jan. 19, 2012 issued in corresponding U.S. Appl. No. 12/861,803; 28 pages.

(56) References Cited

OTHER PUBLICATIONS

United States Patent and Trade Mark Office; Office Action dated Oct. 7, 2013 issued in corresponding U.S. Appl. No. 12/861,803; 24 pages.

United States Patent and Trade Mark Office; Office Action dated Mar. 12, 2015 issued in corresponding U.S. Appl. No. 12/861,803; 13 pages.

United States Patent and Trade Mark Office; Office Action dated May 29, 2014 issued in corresponding U.S. Appl. No. 12/743,354; 21 pages.

United States Patent and Trade Mark Office; Office Action dated Aug. 12, 2013 issued in corresponding U.S. Appl. No. 12/743,354; 21 pages.

\* cited by examiner

On/Off

Timer

Clock

Up Arrow

Down Arrow

Preheat

🔊 Beep (x1)

TEMPERATURE CONTROL SETTING

🔊 Beep (x1)

PROBE MEAT TEMPERATURE SETTING

Level Indicator

🔊 Beep 5secs/min+blink

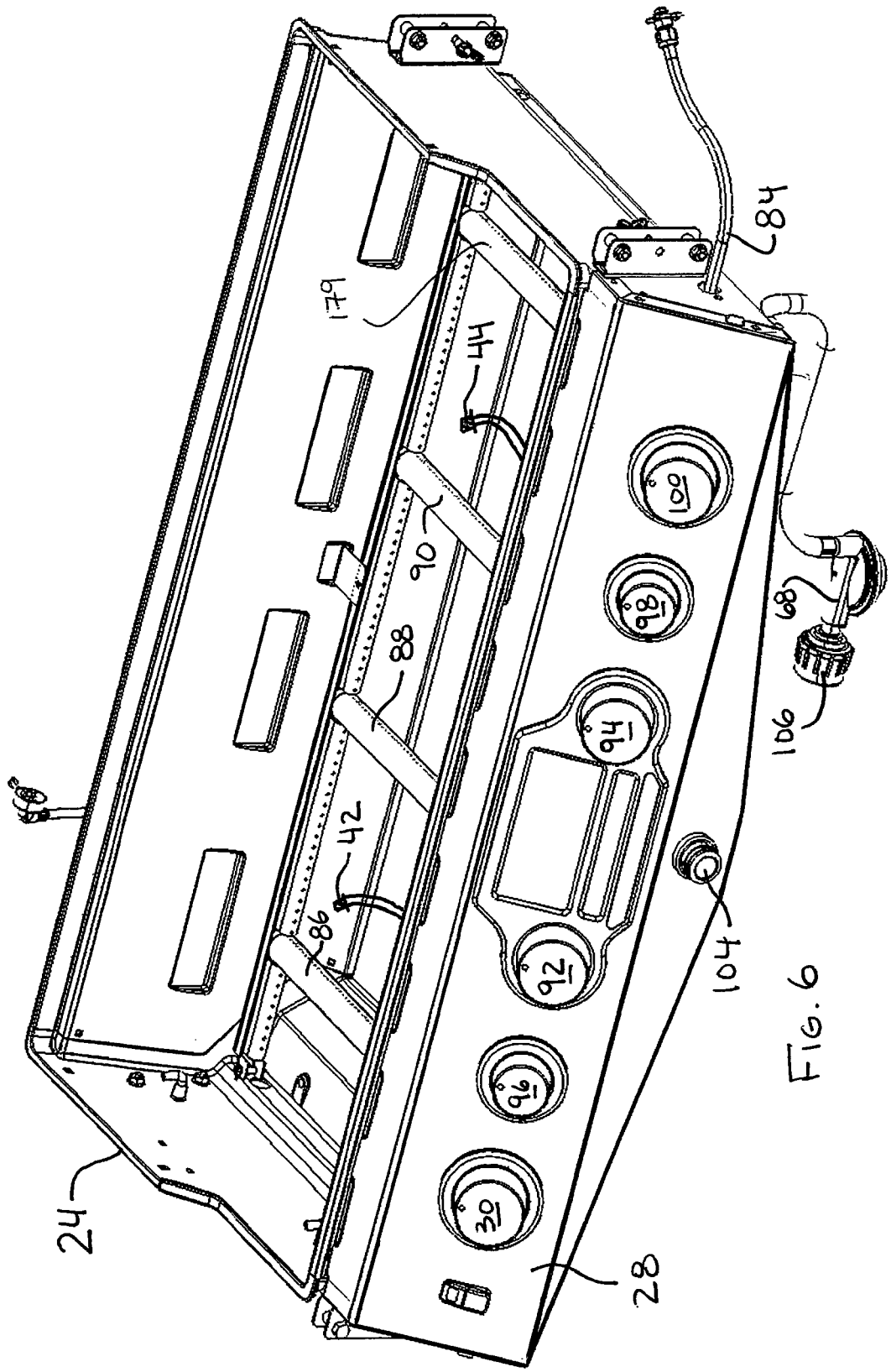

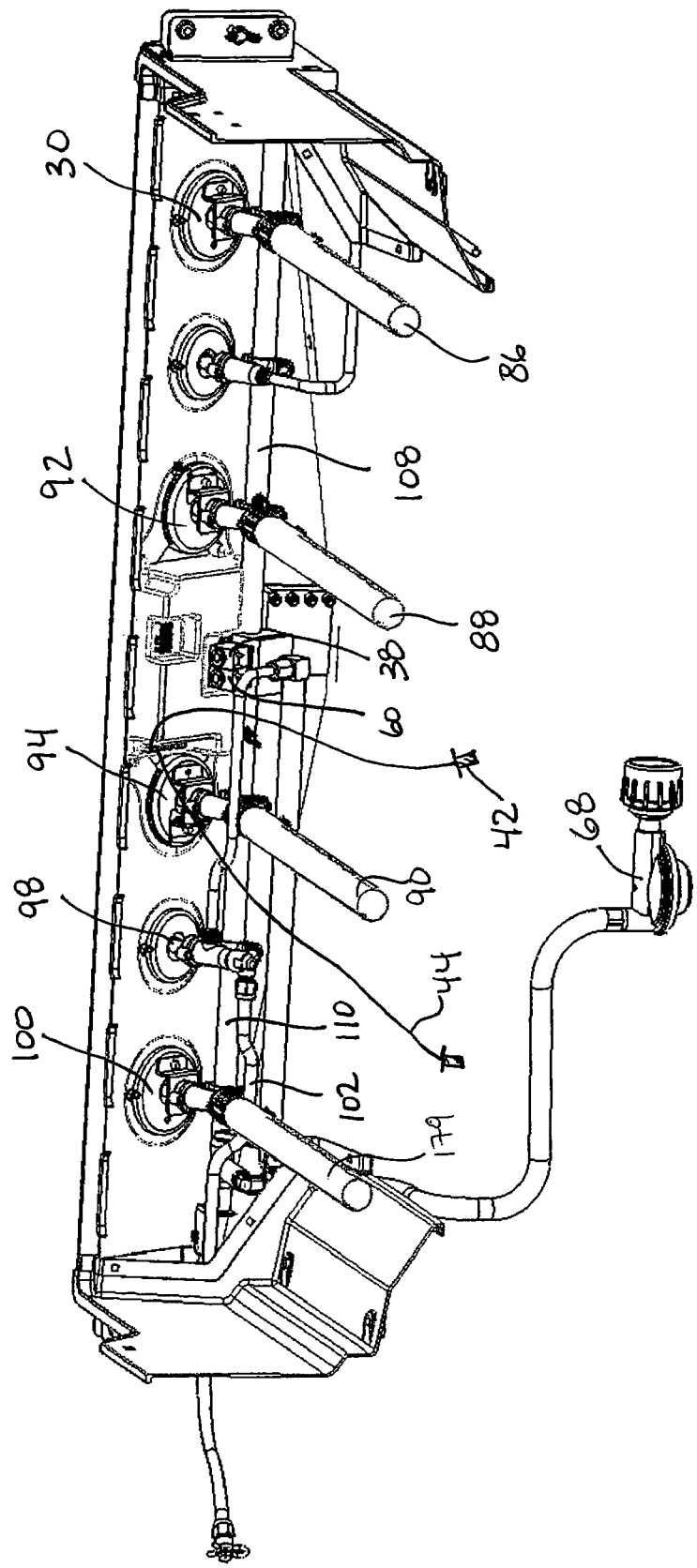

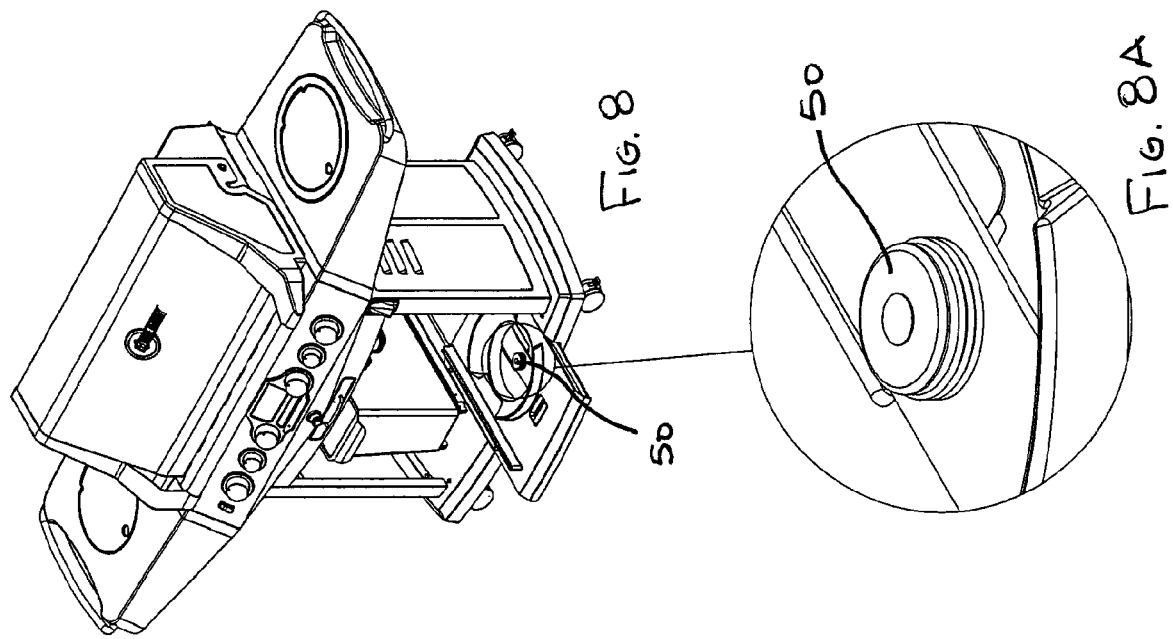
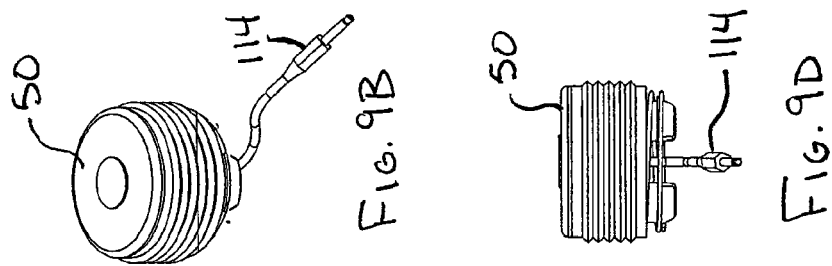
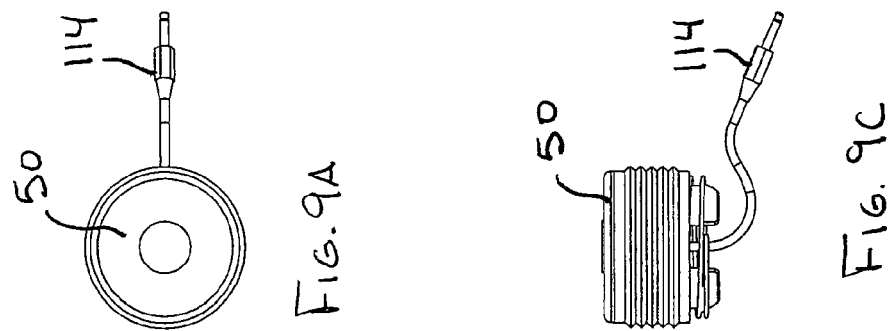

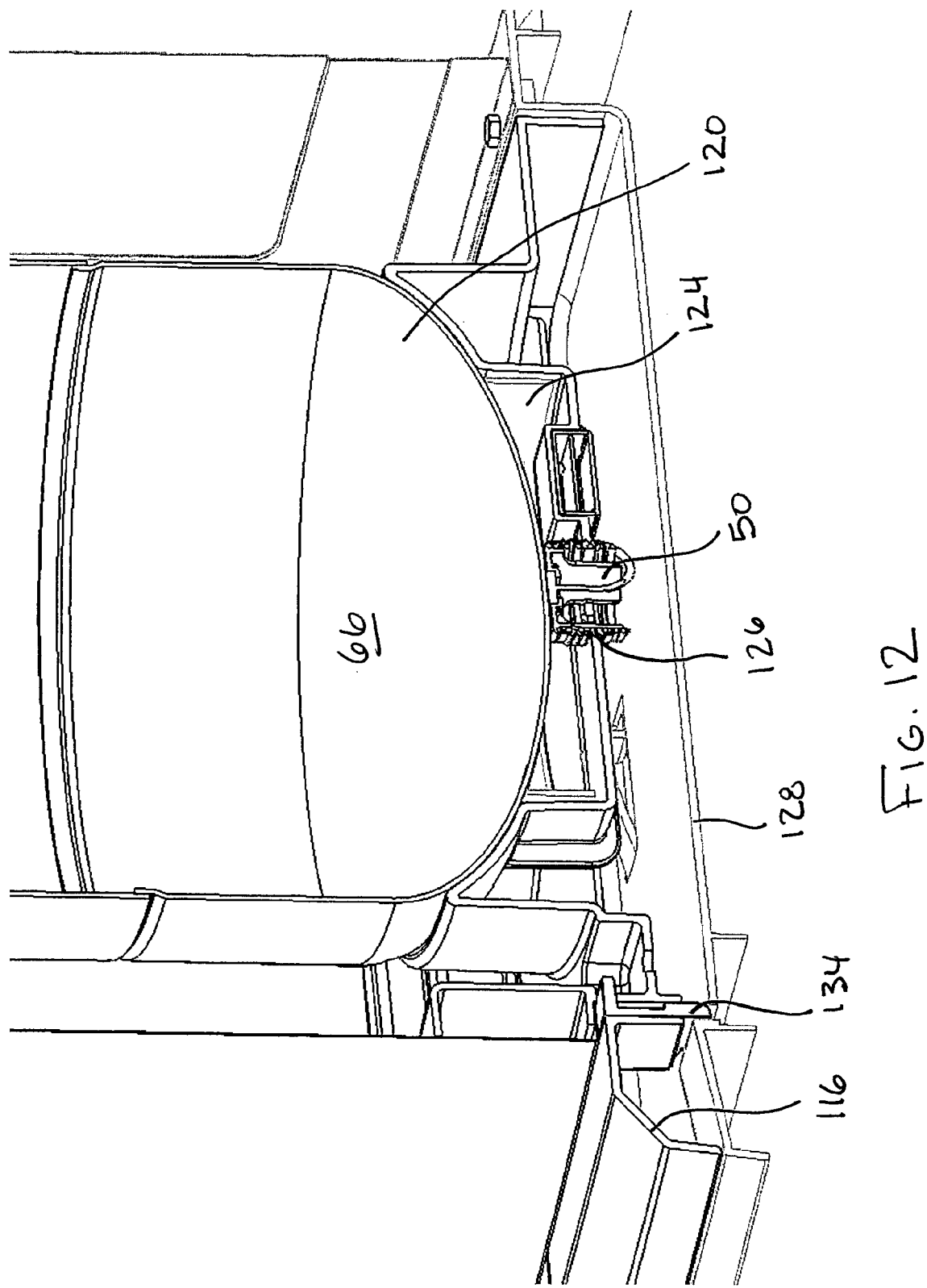

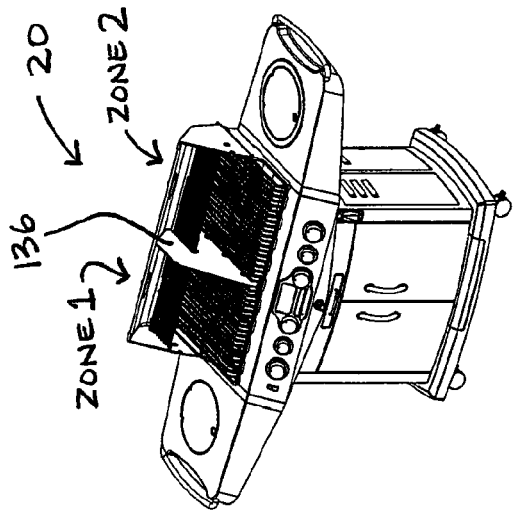
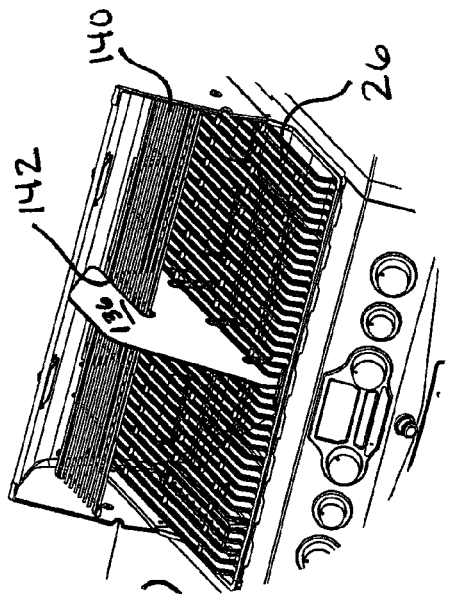
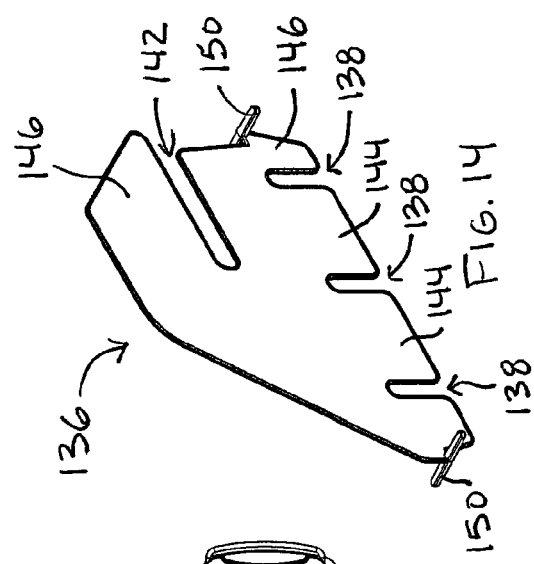
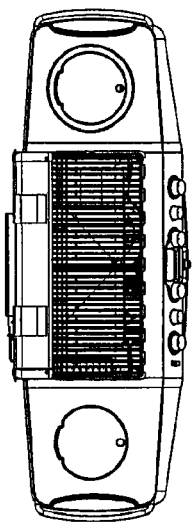
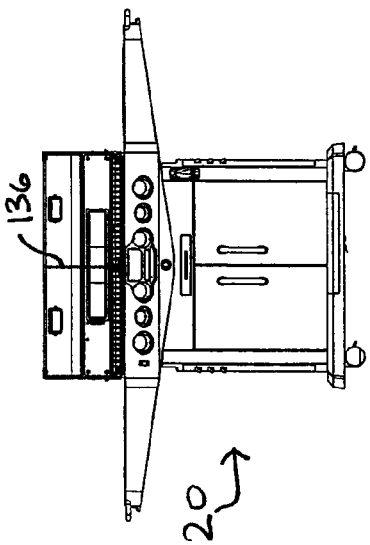

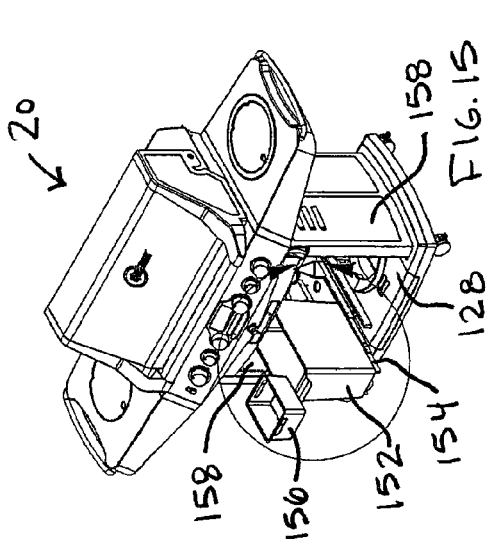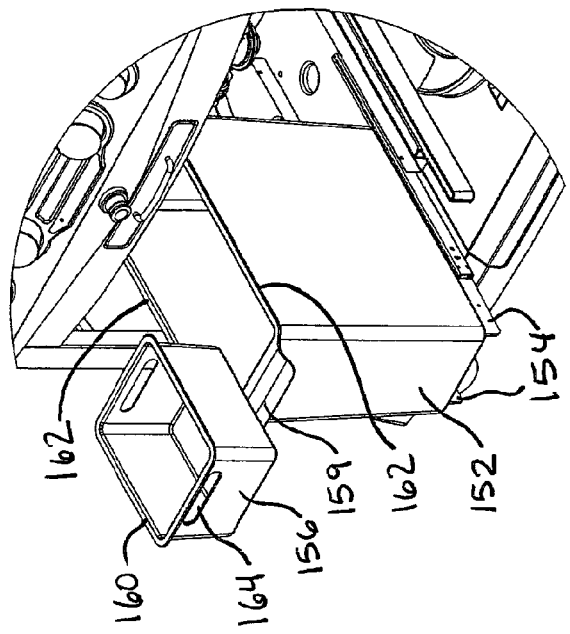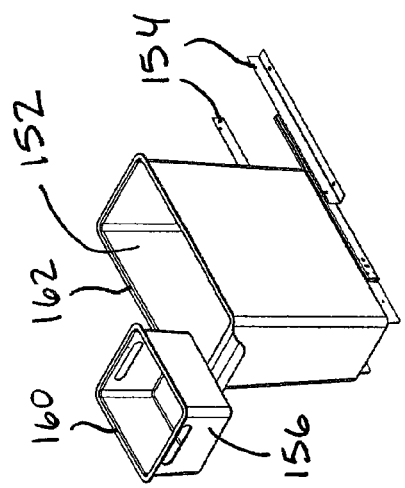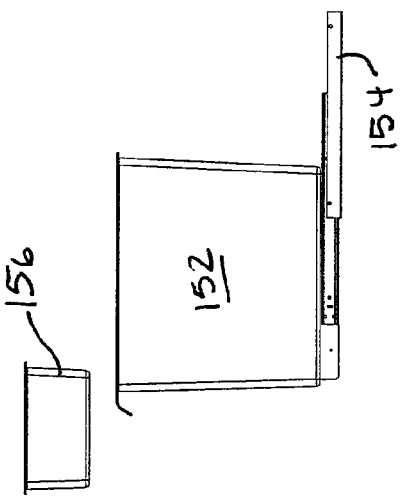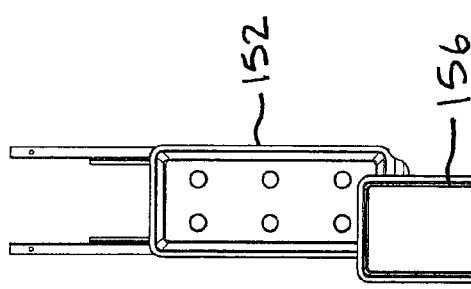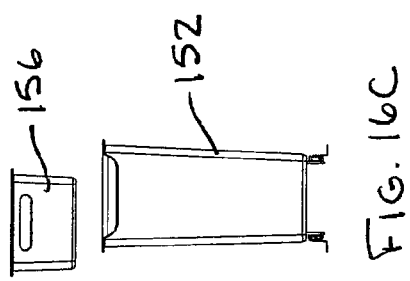

TEMPERATURE CONTROL DEVICE AND METHOD

RELATED APPLICATIONS

This application claims priority to prior pending Patent Co-operation Treaty Application having Serial No. PCT/CA2007/002085, filed Nov. 16, 2007; pending U.S. patent application Ser. No. 12/000,163, filed Dec. 10, 2007; and pending Canadian Patent Application No. 2,613,858, filed Dec. 10, 2007, all the specifications of which prior applications are incorporated herein by reference.

FIELD OF THE INVENTION

The invention relates to a temperature control apparatus, and is particularly concerned with a TEMPERATURE CONTROL APPARATUS AND METHOD for a grill, barbeque, fryer, heater, patio heater, fireplace, fire pit/bowl, or any other apparatus which includes a energy source that may be controlled.

BACKGROUND OF THE INVENTION

Traditionally, barbecues, grills and other cooking or heating apparatus have not included means for automatically managing the temperature of the energy output by the apparatus. Control of temperature is often managed manually by observation (or sensing) of a temperature state of the apparatus, and manually adjusting the temperature to attempt to achieve a desired temperature.

SUMMARY OF THE INVENTION

In accordance with a broad aspect of the present invention there is provided a temperature control system for controlling the rate of flow of a flammable fluid at generally constant pressure. The system may include a flow control apparatus that is free of a regulator mechanism, for affecting the flow of the fluid. The flow control apparatus may be operable between at least a first flow rate and a second flow rate, and may have at least one upstream opening and at least one downstream opening. The system may also include a first burner in fluid communication with the downstream opening of the flow control apparatus and a conduit in fluid communication at one end thereof with the upstream opening of the flow control apparatus, and configured at the other end thereof for connection to a fuel supply. A thermocouple may be located in the vicinity of the burner, for converting a sensed thermal state into an electrical signal. An electronic controller, in communication with the flow control apparatus, for activating the flow control apparatus to one of said first and second flow rates, and being in communication with the thermocouple for receiving the electrical signal from the thermocouple is also provided. An interface connected to the controller for manually inputting a desired temperature may be included, wherein the controller is operable to automatically cycle the flow control apparatus between the first and second flow rates until the temperature sensed by the thermocouple is similar to the desired temperature. The system is free of a regulator between an upstream end of the conduit and the burner.

In an embodiment of the present invention the controller is pre-programmed with a first temperature set point and a second temperature set point relative to the desired temperature input by the user, and the controller is pre-programmed to automatically cycle the flow control apparatus between the first flow rate when the thermocouple communicates a temperature above said second set point, and the second flow rate when the thermocouple communicates a temperature below said first set point.

Conveniently, the controller may be pre-programmed with a first temperature set point and a second temperature set point relative to the desired temperature input by the user, and the controller is pre-programmed to automatically cycle the flow control apparatus between the first flow rate when the thermocouple communicates a temperature above said second set point, and the second flow rate when the thermocouple communicates a temperature below said first set point.

According to another broad aspect, the system may include at least one manually controllable valve located between the upstream end of the conduit and the burner, the at least one manually controllable valve having a total minimum flow rate generally equal to the first flow rate of the flow control apparatus. The system may also include at least one of a solenoid valve and a latch valve.

The system may be part of a barbecue grill assembly having and enclosure, the thermocouple and burner being mounted within the enclosure.

According to another aspect, a second flow control apparatus operable between at least a third flow rate and a fourth flow rate, and having at least one upstream opening and at least one downstream opening may be provided. The second flow control apparatus may be in fluid communication at the upstream opening thereof with the fuel supply. The system may also include a second burner in fluid communication with the downstream opening of the second flow control apparatus, and a second thermocouple, located in the vicinity of the second burner, for converting a sensed thermal state into an electrical signal. The controller may be in communication with the second flow control apparatus and is capable of activating said flow control apparatus to one of said third and fourth flow rates. The controller may also be in communication with the second thermocouple for receiving the electrical signal from the second thermocouple. The interface may be configured for manually inputting a second desired temperature, and the controller may be operable to automatically cycle the second flow control apparatus between the third and fourth flow rates until the temperature sensed by the second thermocouple is similar to the second desired temperature.

According to another broad aspect, the system may include a divider located adjacent the first and second burners for thermally inhibiting transference of a thermal output of the first and second burners through the divider.

In another aspect, the controller may include at least one additional pair of set points, each additional pair corresponding to a different possible temperature input by the user.

In accordance with another broad aspect, there may be provided a divider system for inhibiting heat transfer within an enclosed volume of a gas barbeque, wherein the enclosed volume defined by an openable lid and a base, and the base supports a grill having openings therein for permitting the passage of thermal energy. The divider may include a non-flammable rigid sheet having a low thermal conductivity and a perimeter which is defined to generally conform to a cross-section of the enclosed volume in a plane generally perpendicular to said grill. The sheet may include at least one rebate therein for receiving at least one of the grill and the base to permit placement of the divider into the barbeque and to permit closure of the lid to thermally sub-divide the enclosed volume.

In an embodiment, the divider may include a support feature mounted thereto for abutting at least one of an edge of the base and the grill to inhibit lateral movement of the divider when installed within the enclosure.

In a further embodiment, the divider may include the support feature extends generally perpendicular to the divider to lie flush with at least one of the base and the grill when installed within the enclosure.

In a yet further embodiment, the divider may include a support feature mounted to at least one of the base and the grill for abutting the rigid sheet to inhibit lateral movement of the divider when installed within the enclosure. The feature may be a slot defined in the base for receiving and edge of the rigid sheet. Alternatively, the divider is permanently mounted to at least one of the base and grill. The divider may also include a rebate defined therein for receiving a feature of the barbeque, and the feature may be a warming rack.

In a further aspect, the rebate may be defined by a tongue of the divider, wherein the tongue extends into a volume defined by the base.

According to another broad aspect, there is provided a support for a fuel container including a base defining a receptacle for receiving an end of the fuel container, wherein the receptacle is a shape generally complimentary to the end. There may also be provided a fuel level sensor retainer within the base for receiving and positioning a fuel level sensor in abutting relationship with the fuel container when the fuel container is placed within the receptacle.

According to a yet further broad aspect there is provided a method for controlling the rate of flow of a flammable fluid at generally constant pressure using a flow control apparatus, and the flow control apparatus is free of a regulator mechanism and settable at one of a first flow rate and a greater second flow rate. This may be used to achieve a desired temperature within a cooking apparatus having at least one volume defined therein. The method may include the steps of:
 assessing whether the flow control apparatus is to be automatically controlled; when the flow control apparatus is to be automatically controlled:
  assessing the temperature within the cooking apparatus;
  maintaining the flow state of the flow control apparatus when the temperature within the cooking apparatus is within the range of about:
   (i) an upper threshold value, which upper threshold value is greater than the desired temperature, and
   (ii) a lower threshold value, which lower threshold value is less than the desired temperature;
  assessing whether the temperature within the cooking apparatus is generally higher than the upper threshold value; and
 setting the flow control apparatus to the first flow rate when the temperature within the cooking apparatus is generally higher than the upper threshold value.

In an embodiment, the method may further include the step of assessing whether the temperature within the cooking apparatus is generally lower than the lower threshold value; and setting the flow control apparatus to a second flow rate when the temperature within the cooking apparatus is generally lower than the lower threshold value.

In a further embodiment, the method may further include the step of assessing whether a safety condition occurs; and setting the flow control apparatus to a first flow rate when the safety condition occurs.

Conveniently, the method may further include the step of: assessing whether the flow control apparatus is to be manually controlled; and setting the flow control apparatus to a second flow rate when the flow control apparatus is to be manually controlled.

Conveniently, the method may further include the step of: activating an alarm when a safety condition occurs.

In another aspect the upper threshold value may be about two degrees Fahrenheit greater than the desired temperature.

One or more of the steps may be repeated.

Further, one or more of the assessing steps may be repeated every one to sixty seconds. Alternatively, one or more of the steps are repeated sequentially.

In a further aspect, the step of assessing the safety condition may include at least one of:
 assessing whether the temperature of the cooking vessel is about or higher than a predetermined safety threshold temperature;
 assessing whether the rate of increase in temperature is about or greater than a predetermined safety temperature increase rate; and
 assessing whether the rate of decrease in temperature is about or less than a predetermined safety temperature decrease rate.

Additionally, the method may further include the step of making the desired temperature equal to a lower keep warm temperature after a predetermined period of time has elapsed.

Conveniently, the cooking apparatus may include a second volume defined therein, and a second flow control apparatus for achieving a second desired temperature within the second volume, the method further include the steps of:
 assessing whether the second flow control apparatus is to be automatically controlled;
 when the second flow control apparatus is to be automatically controlled:
  assessing the temperature within the second volume;
  maintaining the flow state of the second flow control apparatus when the temperature within the second volume is within the range of about:
   (i) an second upper threshold value, which second upper threshold value is greater than the second desired temperature, and
   (ii) a second lower threshold value, which second lower threshold value is less than the second desired temperature;
  assessing whether the temperature within the second volume is generally higher than the second upper threshold value; and
 setting the second flow control apparatus to the first flow rate when the temperature within the cooking apparatus is generally higher than the upper threshold value.

In a yet further broad aspect, there may be provided a temperature control device for controlling a flow control apparatus that controls the rate of flow of a flammable fluid at generally constant pressure to heat a cooking apparatus to a desired temperature, the device may include:
 a microprocessor for controlling operation of the flow control apparatus;
 an interface connected to the microprocessor for manually inputting the desired temperature; and
 a memory coupled to the microprocessor;
the temperature control device including a temperature control module resident in memory for execution by the microprocessor, the module being configured to:
 assess the temperature within the cooking apparatus;
 maintain the flow state of the flow control apparatus when the temperature within the cooking apparatus is within the range of about:
  (i) an upper threshold value, which upper threshold value is greater than the desired temperature, and (ii) a lower threshold value, which lower threshold value is less than the desired temperature;

assess whether the temperature within the cooking apparatus is generally higher than the upper threshold value; and set the flow control apparatus to the first flow rate when the temperature within the cooking apparatus is generally higher than the upper threshold value.

Additionally, the device may be additionally configured to: assess whether the temperature within the cooking apparatus is generally lower than the lower threshold value; and set the flow control apparatus to a second flow rate when the temperature within the cooking apparatus is generally lower than the lower threshold value.

In a further embodiment, the device may be additionally configured to: make the desired temperature equal to a lower keep warm temperature after a predetermined period of time has elapsed. The device may also include a storage device coupled to the microprocessor.

According to a yet further broad aspect, there may be provided a computer program product having a computer readable medium tangibly embodying code for activation of a temperature control device, the computer program product include:

code for assessing the temperature within the cooking apparatus;

code for maintaining the flow state of the flow control apparatus when the temperature within the cooking apparatus is within the range of about:
(i) an upper threshold value, which upper threshold value is greater than the desired temperature, and
(ii) a lower threshold value, which lower threshold value is less than the desired temperature;

code for assessing whether the temperature within the cooking apparatus is generally higher than the upper threshold value; and code for setting the flow control apparatus to the first flow rate when the temperature within the cooking apparatus is generally higher than the upper threshold value.

Additionally, the computer program product may further include code for assessing whether the temperature within the cooking apparatus is generally lower than the lower threshold value; and code for setting the flow control apparatus to a second flow rate when the temperature within the cooking apparatus is generally lower than the lower threshold value.

Additionally, the computer program product may further include code for making the desired temperature equal to a lower keep warm temperature after a predetermined period of time has elapsed.

According to a yet further broad aspect of the invention, there is provided a cooking apparatus. The apparatus includes: a vessel for containing a liquid. It also includes a safety device for controlling the rate of flow of a flammable fluid at generally constant pressure. The safety device may include the following: a flow control apparatus, free of a regulator mechanism, for affecting the flow of the fluid, the flow control apparatus being operable between at least a first flow rate and a second flow rate, and having at least one upstream opening and at least one downstream opening; a first burner in fluid communication with the downstream opening of the flow control apparatus, the burner being located for imparting energy to the vessel; a conduit in fluid communication at one end thereof with the upstream opening of the flow control apparatus, and configured at the other end thereof for connection to a fuel supply; a thermocouple, located in the vicinity of the vessel, for converting a sensed thermal state into an electrical signal; an electronic controller in communication with the flow control apparatus for activating said flow control apparatus to one of said first and second flow rates, and being in communication with the thermocouple for receiving the electrical signal from the thermocouple; and an interface connected to the controller for manually inputting a desired temperature, wherein the controller is operable to automatically cycle said flow control apparatus between said first and second flow rates until the temperature sensed by the thermocouple is similar to the desired temperature. The system is free of a regulator between an upstream end of the conduit and the burner.

Additionally, the apparatus may include a level sensor mounted to the vessel and electronically connected to the controller, the controller being configured to vary fuel flow when the level sensor indicates that the vessel is not level.

According to a further aspect, the vessel may be a fryer for containing liquid oil, and the thermocouple is located for placement within the oil during cooking.

Additionally, the vessel may be a steamer for containing a water based liquid, and the thermocouple is located for placement within one of water and steam inside the vessel during cooking.

Furthermore, at least one of the thermocouple and interface are wirelessly connected to the controller to permit operation of the safety device at a distance from the vessel.

Additionally, the controller may be configured to vary the flow of the fluid upon one of the following events occurring: (i) the thermocouple communicating a rapid increase in temperature; (ii) the thermocouple communicating a temperature higher than a pre-determined safe temperature; (iii) the thermocouple communicating a temperature lower than a pre-determined temperature; (iv) the thermocouple communicating a rapid decrease in temperature.

Additionally, the apparatus may include an overflow sensor mounted to the vessel and electronically connected to the controller, the controller being configured to vary fuel flow when the overflow sensor indicates that a liquid within the vessel has contacted the sensor.

Conveniently, the overflow sensor may be a second thermocouple and is located adjacent the top of the vessel.

According to a yet further broad aspect of the invention, there is provided a heater, including: a support stand for a burner; and a system for controlling the rate of flow of a flammable fluid at generally constant pressure. The system may include: a flow control apparatus, free of a regulator mechanism, for affecting the flow of the fluid, the flow control apparatus being operable between at least a first flow rate and a second flow rate, and having at least one upstream opening and at least one downstream opening; a first burner mounted to the support stand, the burner being in fluid communication with the downstream opening of the flow control apparatus, the burner being located for imparting energy to the vessel; a conduit in fluid communication at one end thereof with the upstream opening of the flow control apparatus, and configured at the other end thereof for connection to a fuel supply; a thermocouple, located in the vicinity of the vessel, for converting a sensed thermal state into an electrical signal; an electronic controller in communication with the flow control apparatus for activating said flow control apparatus to one of said first and second flow rates, and being in communication with the thermocouple for receiving the electrical signal from the thermocouple; and an interface connected to the controller for manually inputting a desired temperature, wherein the controller is operable to automatically cycle said flow control apparatus between said first and second flow rates until the temperature sensed by the thermocouple is similar to the desired temperature. The system is free of a regulator between an upstream end of the conduit and the burner.

According to a yet further broad aspect of the invention, there is provided a gas fueled fireplace, including: a fire containment structure; and a system for controlling the rate of flow of a flammable fluid at generally constant pressure. The system may include: a flow control apparatus, free of a regulator mechanism, for affecting the flow of the fluid, the flow control apparatus being operable between at least a first flow rate and a second flow rate, and having at least one upstream opening and at least one downstream opening; a first burner mounted to the containment structure, the burner being in fluid communication with the downstream opening of the flow control apparatus, the burner being located for imparting energy to the vessel; a conduit in fluid communication at one end thereof with the upstream opening of the flow control apparatus, and configured at the other end thereof for connection to a fuel supply; a thermocouple, located in the vicinity of the vessel, for converting a sensed thermal state into an electrical signal; an electronic controller in communication with the flow control apparatus for activating said flow control apparatus to one of said first and second flow rates, and being in communication with the thermocouple for receiving the electrical signal from the thermocouple; and an interface connected to the controller for manually inputting a desired temperature, wherein the controller is operable to automatically cycle said flow control apparatus between said first and second flow rates until the temperature sensed by the thermocouple is similar to the desired temperature. The system is free of a regulator between an upstream end of the conduit and the burner.

Other and further advantages and features of the invention will be apparent to those skilled in the art from the following detailed description of embodiments thereof, taken in conjunction with the accompanying drawings.

BRIEF DESCRIPTION OF THE FIGURES

The present invention will be further understood from the following detailed description of embodiments of the invention, with reference to the drawings in which:

FIG. 6 is an isolated isometric view of the barbecue of FIG. 1 showing a console, burners, and temperature control apparatus;

FIG. 7 is a partial rear view of FIG. 6;

FIG. 8 is an isometric view of the barbecue of FIG. 1 showing a tank support;

FIG. 8A is an enlarged view of a tank sensor of FIG. 8;

FIGS. 9A to 9D include various views of a tank sensor of FIG. 8;

FIG. 12 is an enlarged cross-sectional view of the tank support of FIG. 10 having a tank placed therewithin;

FIG. 13 is an isometric view of the barbecue of FIG. 1 with a lid thereof removed to reveal a divider;

FIG. 13A is an enlarged view of the divider of FIG. 13;

FIGS. 13B to 13D are various views of the barbecue of FIG. 13 and the divider therein;

FIG. 14 is an isolated isometric view of the divider of FIG. 13;

FIG. 15 is an isometric view of the barbecue of FIG. 1 and a storage receptacle;

FIG. 15A is an enlarged view of the receptacle of FIG. 15;

FIGS. 16A to 16D present various isolated views of the storage receptacle, insert and slide rails of FIG. 15;

DETAILED DESCRIPTION OF THE INVENTION

Similar references are used in different figures to denote similar components. The disclosed temperature control apparatus may facilitate control of an internal temperature of a gas fuelled appliance, such as an outdoor gas barbeque. Alternatively, the apparatus may be employed to facilitate the control of energy output of any gas fueled energy generation device such as a heater or fireplace. The description herein is made in the context of a gas fuelled barbeque, but the disclosed temperature control apparatus may be applied to any manner of appliance, including gas fuelled appliances such as stoves, fireplaces, fire pits, heaters, and fryers.

In general, the temperature control apparatus permits a user to input a desired temperature set-point. The temperature control apparatus then automatically controls the flow rate of gas into the barbeque to achieve the desired temperature. This may permit greater precision in the cooking of food with a gas fuelled appliance. For example, more accurate and automatic temperature control may permit a barbeque to be used to bake, in addition to a more traditional grilling of meat. Even the grilling of meat may be improved given that an operator or user has the assistance of a somewhat automated control of the temperature within the barbeque. Such greater diversity of food that may be cooked with a barbeque may have certain advantages, such as encouraging a greater number of women to use a barbeque for cooking.

Figure 1:
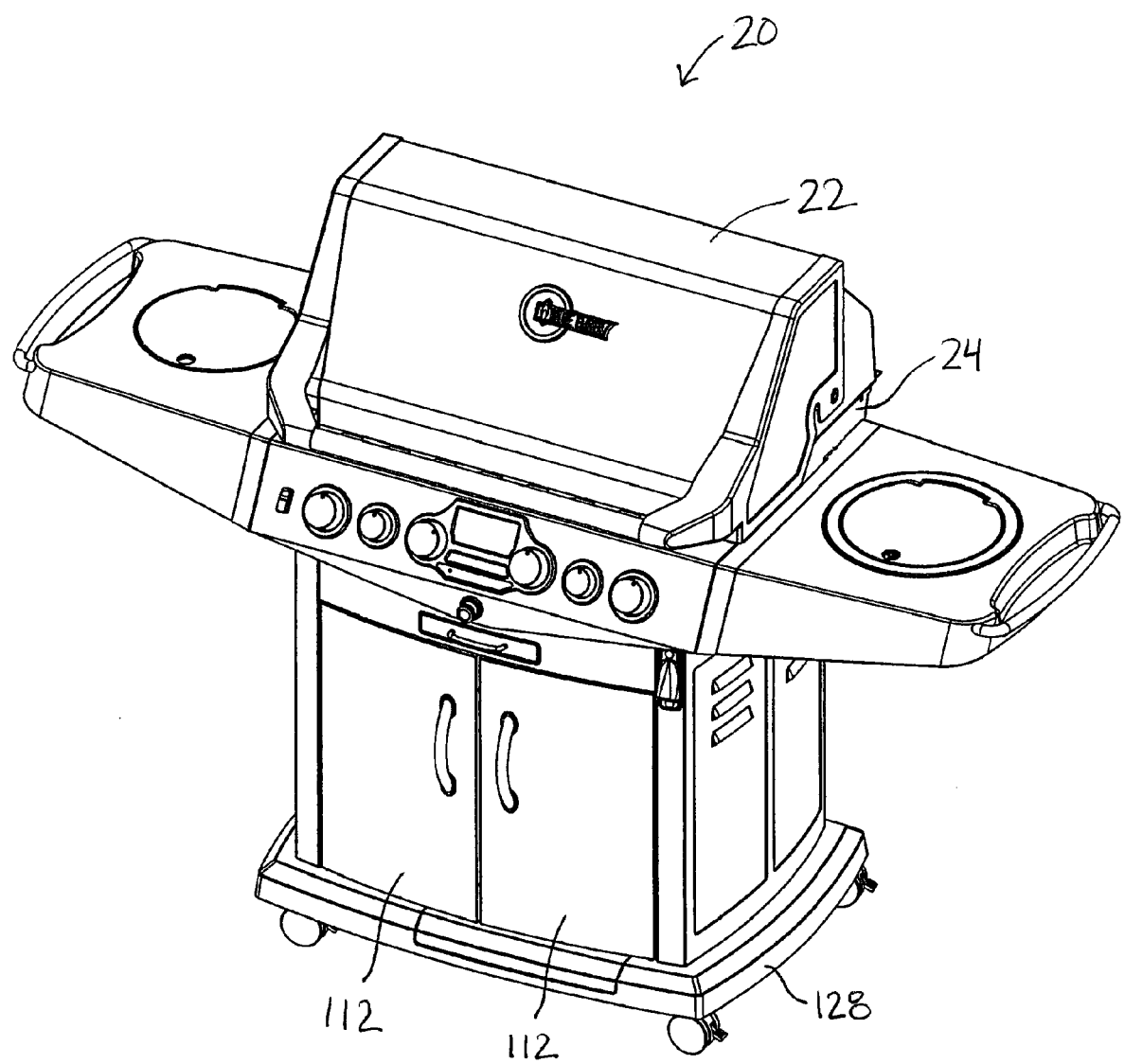
FIG. 1 is an isometric view of a barbecue including a temperature control apparatus.

FIG. 1 illustrates a barbeque 20, which may be a typical barbeque. Barbeque 20 may include an openable lid 22 mounted to a base 24.

Figure 2:
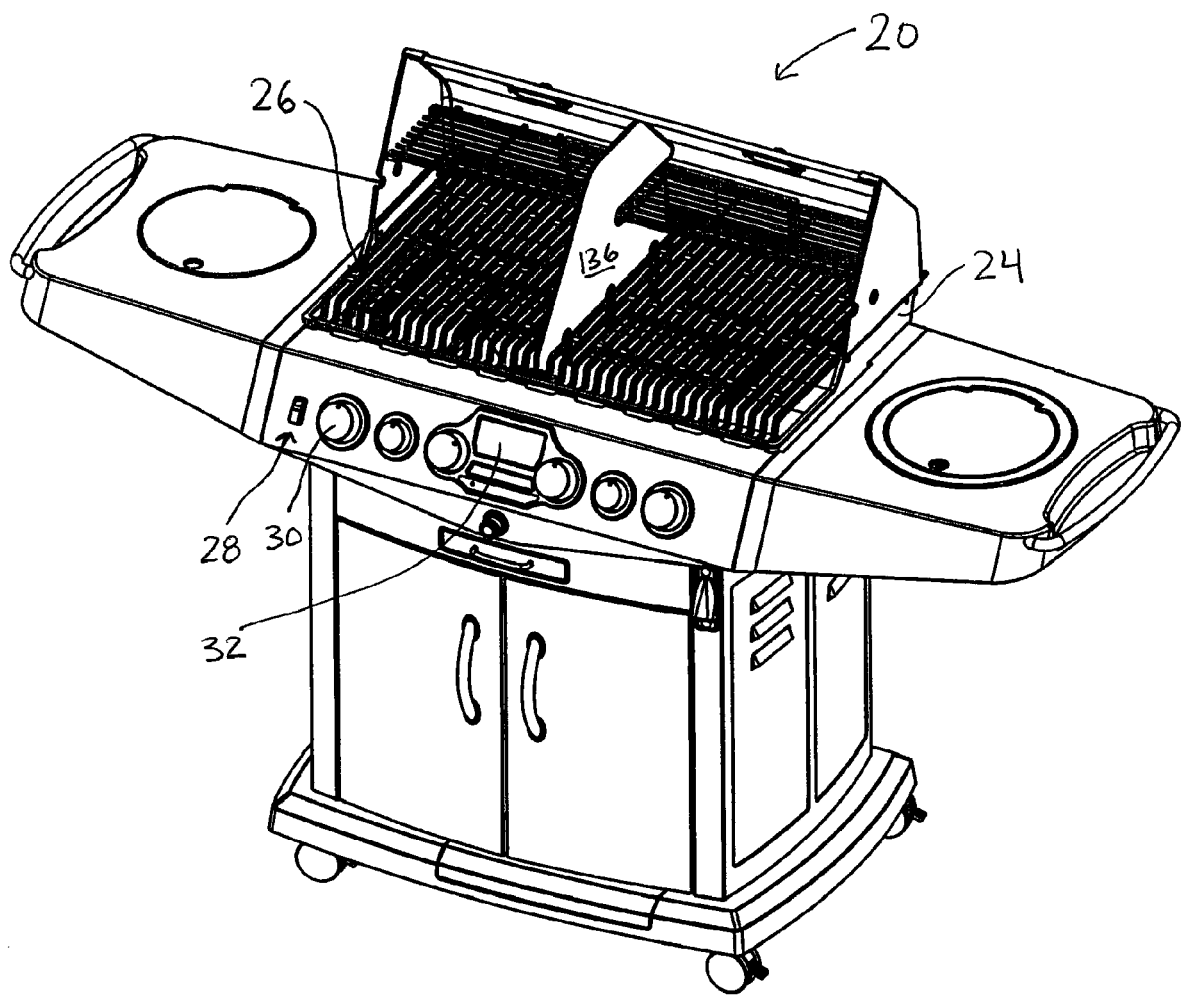
FIG. 2 is an isometric view of the barbecue of FIG. 1 with a lid of the barbecue removed to reveal a grill and divider.

FIG. 2 illustrates the barbeque 20 having lid 22 removed for illustration purposes. Base 24 supports a grill 26. Grill 26 may be used to support food for cooking, or vessels (not shown) containing food for cooking. The particular configuration of the grill base and lid may be modified significantly without materially affecting the operation of the temperature control apparatus. The grill 26 may even be eliminated if suitable means, such as a container (not shown), are employed to support food to be cooked.

Barbeque 20 may also include a console 28 which may be mounted about base 24. Console 28 may be used to support one or more control knobs 30, for manual control of associated valves, and part of a temperature control apparatus 32. It is not necessary that temperature control apparatus 32 be integrally mounted to barbeque 20 via console 28, or to any other feature of the barbeque. The temperature control apparatus 32 may simply be placed upon any suitable part of barbeque 20 and connected to barbeque 20 as described herein. Hence, temperature control apparatus 32 may be used to modify existing barbeques to provide temperature control as described herein. Alternatively, the temperature control apparatus may be integrated with a purpose built barbeque such as barbeque 20.

Figure 3:
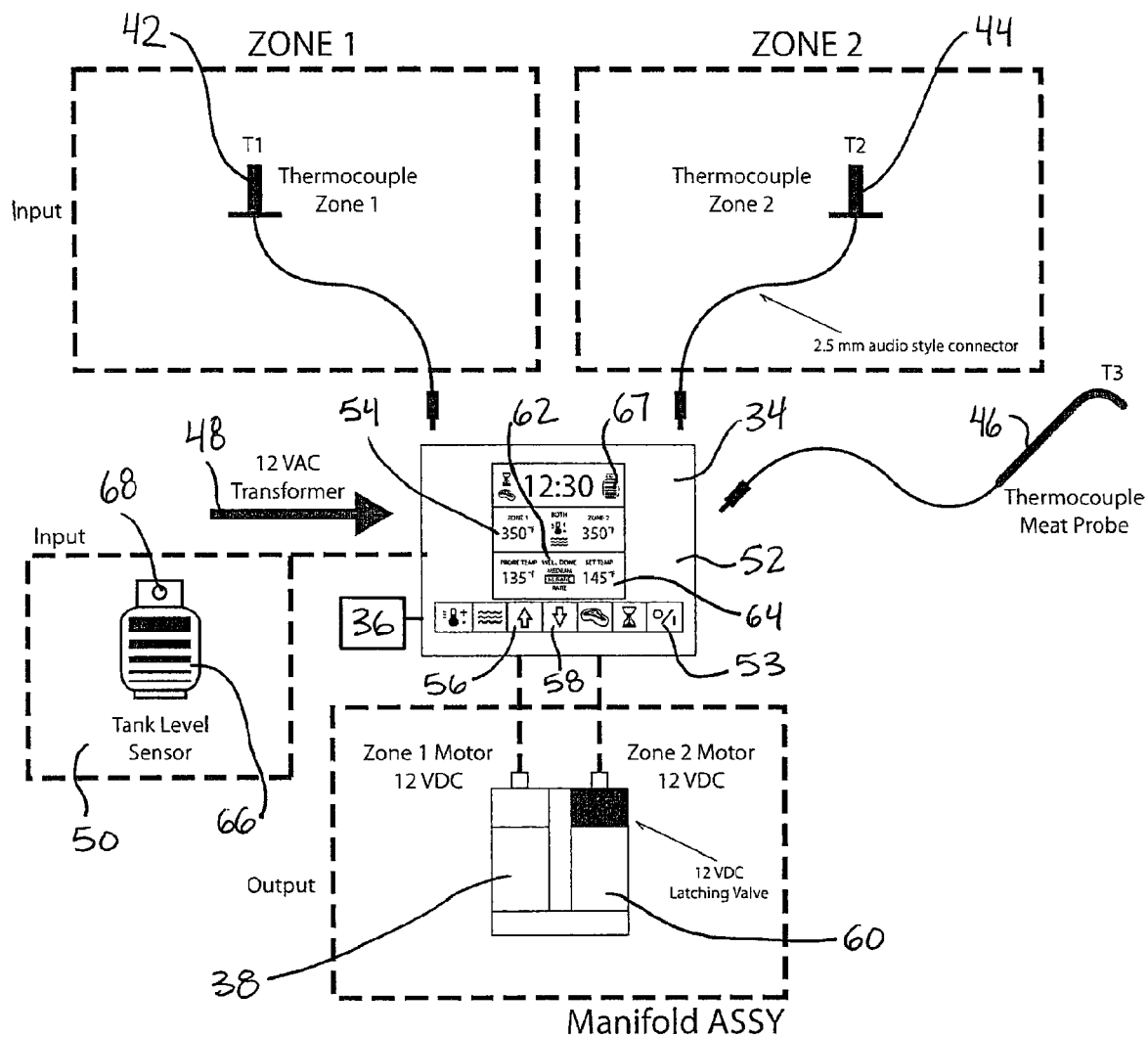
FIG. 3 is a schematic diagram of components included in the temperature control apparatus, and components related thereto.

FIG. 3 provides a schematic overview of the temperature control apparatus 32. Many of the components described herein may be substituted by suitable components that are functionally similar. Temperature control apparatus 32 may include an input device 34. Input device 34 may be a touch sensitive LCD screen (as illustrated), but may alternatively include some other suitable input device, such as a keypad or dial(s).

Temperature control apparatus 32 also includes a microprocessor 36. Microprocessor 36 may be electrically connected to input device 34 for receiving input from a user. Microprocessor 36 is also operatively connected to at least one valve 38. Valve 38 may be any type of electrically or mechanically controlled valve suitable for changing the flow of a gas. In the present embodiment, valve 38 is an electrically controlled valve. For example, valve 38 may be a latching or latch valve. A latch valve having at least two settings, being open and closed or high and low-flow, may be used either in place of or in addition to, another latch valve or a different type of valve such as a solenoid valve. It is preferable that a latch valve having a high and low-flow setting be used, as will be explained below. The latch valve advantageously requires power to change from one setting (e.g., high) to another (e.g., low), but does not require power to maintain any particular setting. This may advantageously reduce the amount of power required for the temperature control apparatus 32. This characteristic may be particularly useful if the temperature control apparatus is powered by battery (not shown) or other portable or limited power supply. If power supply is lost or runs out, then a capacitor (not shown) may be included in temperature control apparatus 32 to enable the latch valve to be switched one (or more) times in or to put it in a desired flow state. For example, if power is lost when the latch valve is in a low flow state, the capacitor may be used to switch it to a high flow state so that barbeque 20 may be then used as a conventional barbeque.

Figure 4A:
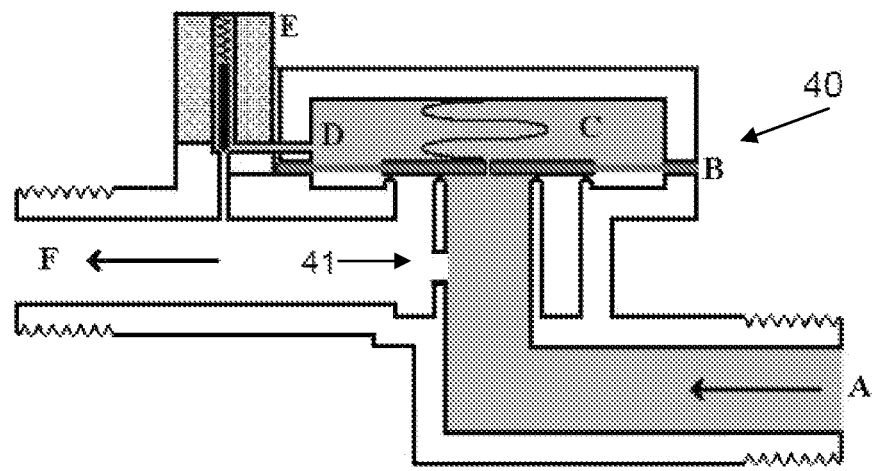
FIG. 4A is a cross-sectional view of a solenoid valve in a closed position.
Figure 4B:
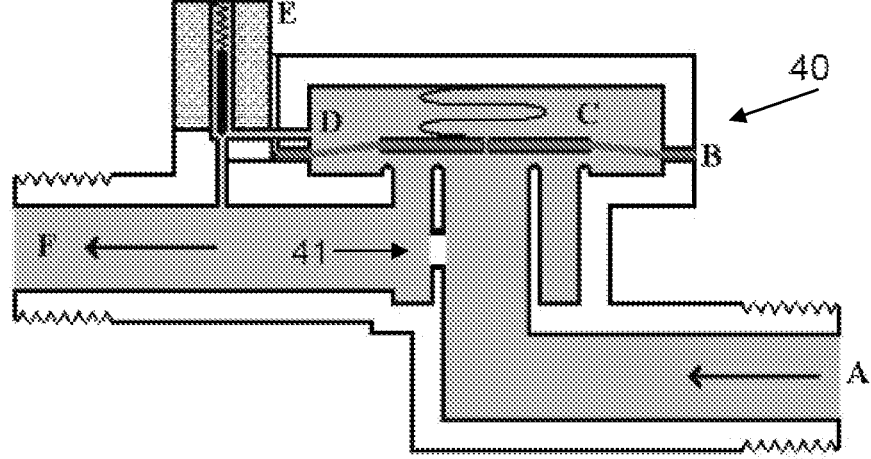
FIG. 4B is a cross-sectional view of the solenoid valve of FIG. 4A in an open position.

Alternative valves such as solenoid valve 40, as shown in FIGS. 4A and 4B, may be used. Any suitable solenoid valve may also be used, and not just the valve illustrated in FIGS. 4A and 4B. FIG. 4A shows solenoid valve in a closed position. FIG. 4B shows the solenoid valve in an open position. Valve 40 may have an opening 41 to encourage a low flow rate when the valve is "closed". In an embodiment, solenoid valve 40 is switchable between at least a low-flow rate and a high-flow rate. A solenoid valve may be less suitable for uses where power is at a premium because a solenoid valve typically requires power to maintain the valve in at least one of its flow states. This may cause a draw on power, such as battery power. However, if the solenoid valve requires power to enter a low flow rate, then when power is lost, it will automatically revert to a high flow rate, enabling barbeque 20 to be used as a conventional barbeque, without the need for additional power or a capacitor. Valves such as 38 and 40 may alternatively include two valve mechanisms within a single unit, which may provide a more cost effective and/or compact arrangement when more than one valve is employed.

Referring again to FIG. 3, microprocessor 36 may be operatively connected to a thermocouple, such as thermocouple 42. Additional thermocouples may be used, as needed. For example, if temperature control apparatus 32 is used to control the temperature of more than one barbeque, or more than one area or zone within a given barbeque, then multiple thermocouples may be used. Additionally, multiple thermocouples may be used to obtain a more accurate reading within a single barbeque enclosure. In one embodiment just one valve may be used to control temperature in a single barbeque enclosure or zone.

In the embodiment described herein, a second thermocouple 44 is employed so that temperature control apparatus 32 may be used to control the temperature within two different zones of barbeque 20 (this is described in further detail below). Optionally, an additional thermocouple, such as meat probe 46 may be connected to microprocessor 36 to permit the monitoring of the temperature of a food, such as meat being cooked within barbeque 20.

Temperature control apparatus 32 may receive power from a power supply 48. Power supply 48 preferably provides 12 volts AC. Temperature control apparatus 32 may also be configured to run on some other suitable voltage, including DC current, provided that suitable circuitry is included with temperature control apparatus 32 to accept such power. Using DC power may permit a battery or other portable form of power to be used. Typically, a 120 volt AC power supply is used and is then converted by a transformer to 12 volt AC power.

Microprocessor 36 may accept other inputs such as from a tank level sensor 50. Tank level sensor 50 provides a signal to microprocessor 36 to indicate the level of a connected fuel supply, which may be used to calculate the time remaining before additional fuel is needed either at the current fuel usage rate, an average fuel usage rate, or some other appropriate measure. This may done by monitoring the rate of change over time and predicting (extrapolating) the time when the tank will be out of fuel. If another gas source is used, for example from a natural gas line, then the tank sensor functionality may be removed or eliminated.

The various connections between the components of the temperature control apparatus 32 may be wired or wireless, and may include standard connectors, such as 2.5 millimeter audio style connectors, or may be hard-wired or use some other connection, as desired.

Input device 34 may have any of a number of suitable configurations as noted. At its simplest, input device 34 may be a dial, switch or lever that may be moved to select a higher or lower desired temperature for the barbeque 20. In the illustrated embodiment, input device 34 includes an LCD screen 52 that may be backlit (or may have a sensor or timer to limit or eliminate the amount of back light in order to conserve power, if needed). LCD screen 52 may be touch sensitive, or may be activated using some other input device such as a keypad, a keyboard, a light pen, a mouse, or some other device. The particular layout and style of the graphics for the interface of LCD screen 52 may be configured as needed. No particular layout is required. Aside from the functionality to input a set-point temperature, all other functionality is optional. However, some configurations, such as those described herein, may facilitate inputs to be made and readings to be displayed.

The temperature control apparatus 32 may be activated by pressing the on/off button 53 of the LCD screen 52 (when temperature control apparatus 32 is not activated, barbeque 20 may operate as a conventional barbeque). Once activated, a desired temperature may be set by pressing the temperature area, such as zone control button 54 of the LCD screen 52. A set-point temperature may then be entered using up and down arrows 56 and 58 to increase or decrease the desired target temperature. The barbeque 20 may be configured to achieve a wide range of temperatures. For example, the barbeque 20 may be configured to achieve temperatures between 40° C. and 200° C., or 35° C. to 300° C., or 50° C. to 350° C., or to any suitable combination of temperature ranges. The barbeque 20 may also be purpose built for a very narrow temperature range such as between 200 and 300° C. The temperature control apparatus 32 may be configured to achieve any range of temperatures depending on the barbeque 20 configuration.

Once a desired temperature is set, microprocessor 36 compares a signal received from thermocouple 32. The signal indicates the temperature in the vicinity of thermocouple 42. If the temperature conveyed by thermocouple 42 is within a given range of the set-point temperature, then nothing is done by microprocessor 36. The range within which the temperature conveyed by thermocouple 42 may differ from the desired set-point may be as low as a fraction (for example, 0.1 of a degree) or as large as one or more degrees, including plus or minus 5° or 10° (Celsius or Fahrenheit). Improved accuracy may be obtained by reducing the range by which the temperature conveyed by thermocouple 42 may differ from the desired temperature set via input device 34.

The range of variation relative to the desired temperature may have a first or lower threshold value, and a second or upper threshold value. While the difference between the lower and upper threshold values may be small, in order to more closely achieve the desired temperature, a small difference in these values may cause the valves, and possibly other components to operate more frequently. This frequent operation may reduce the effective lifetime of such components. Such frequent use may also increase the power consumption, which may be undesirable if there is a limited or restricted power supply. While a greater difference between upper and lower threshold values may produce greater variation in the actual temperature of the barbeque 20, less energy may be used and a longer life may be obtained from at least some of the components of barbeque 20.

For example, a lower/upper difference of 10° F. (i.e., plus or minus 5° F. about the desired temperature) may provide suitable results. Alternatively, ranges as small as 1° F. or as large as 50° F., or larger depending on the cooking needs. The upper and lower limits for the range may be static relative to the temperature set-point. For example, they may be set to always be within 5° F. of the desired temperature. Alternatively, the upper and lower set-points may vary depending of the temperature set-point. For example, the upper and lower limits may be within 10° F. of the desired temperature at a lower temperature such as 40° F., whereas they may define a smaller range, for example, plus or minus 3° F., relative to a higher set-point temperature, such as 200° F.

This dynamic variation of upper and lower set-points may be used advantageously to take advantage of the thermal dynamic characteristics of the barbeque assembly 20.

When microprocessor 36 receives a signal from thermocouple 42 indicating a temperature greater than (or optionally, equal to) an upper limit value, microprocessor 36 sends a signal to valve 38 to cause it to enter a low or no-flow state.

In the present embodiment, valve 38 enters a low-flow state. Microprocessor 36 compares temperature information from thermocouple 42 and compares it with the upper and lower limits as frequently as once per second, or fraction of a second, or as infrequently as every several minutes. The typical range for this comparison may be between 0 to 30 seconds. This provides sufficient time for a change in the temperature of the barbeque 20 to stabilize after a change in the state of valve 38.

When microprocessor 36 determines that the temperature conveyed by thermocouple 42 has fallen below a lower threshold (or alternatively, is equal to a lower threshold), then it may signal valve 38 to turn on or to switch to a high-flow state. This may cause the temperature within barbeque 20 to increase above the lower threshold. Microprocessor 36 may continue to receive signals from thermocouple 42, and to cycle valve 38 between high and low (or, in some embodiments, off) states in order to achieve a desired temperature within barbeque 20. For example, when microprocessor 36 compares the temperature of thermocouple 42 against the lower and upper temperature thresholds every 5 seconds, and the upper and lower threshold values are separated by a range of 10° F., the temperature within barbeque 20, having a closed lid 22, has been found to be maintainable within as little as one or two degrees Fahrenheit of the desired temperature.

A safety feature may be included in the temperature control apparatus 32. Microprocessor 36 may include memory (not shown), if needed, for example, for storing historical temperature data. In an embodiment, at least the previous reading from thermocouple 42 may be stored for comparison with a subsequent reading. If a difference between the previous and subsequent readings relative to the time between readings is sufficiently great or sufficiently small, then an alarm may sound. Furthermore, if the differences in the previous and subsequent temperatures is great enough, microprocessor 36 may signal valve 38 to change into an off or low-flow state. This may occur, for example, if there is a flare-up or fire within the barbeque 20, causing a rapid increase in the temperature therein. Alternatively, if there is a rapid decrease in temperature, then the flame may have gone out and the flow of fuel may need to be shut off or reduced. In either case, an alarm may sound to alert the user to an error condition.

As noted, more than one thermocouple may be employed within a single barbeque assembly 20. In such case, microprocessor 36 may take an average or weighted reading of the various thermocouples to determine the temperature of the barbeque 20. Alternatively, barbeque 20 may be divided into two or more zones (or additional barbeques may be connected to temperature control apparatus 32), with at least one thermocouple being placed in each zone or barbeque.

When temperature control apparatus 32 is connected to thermocouples in two or more thermally separated zones of barbeque 22, different temperature states may be achieved within barbeque 20. For example, a desired temperature may be set for thermocouple 44 in a manner similar to that set for thermocouple 42. Thermocouple 44 may be set at a temperature the same as, higher than, or lower than the zone in which thermocouple 42 is placed (for example, zones 1 and 2 are illustrated in FIG. 3). Zones 1 and 2 may be thermally separated by a physical divider (as described in further detail below) or they may simply represent different areas within barbeque 20. If zones 1 and 2 are not physically divided, then achieving significantly different temperatures between thermocouple 42 and thermocouple 44 may be more difficult. Nevertheless, barbeque 20 may include a generally warmer area and a generally less warm area. When more than one zone or barbeque is to be controlled using the temperature control apparatus 32, then at least one additional (or integrated) valve assembly 60 may be used for each zone controlled by temperature control apparatus 32. Microprocessor 36 may then be configured to independently control each respective valve, such as 38 and 60, in response to temperatures encoded by thermocouples 32 and 44.

Temperature control apparatus 32 may also operate in conjunction with a thermocouple 46. Input device 34 may be used to enter a type of meat (such as, pork, beef, chicken, or lamb) and a desired doneness (e.g., well done, medium, medium-rare, or rare). Microprocessor 36 may then control the temperature of barbeque 20 employing one or both thermocouples 42, 44, to achieve a pre-determined temperature in order to cook the meat to a desirable extent.

Temperature control apparatus 32 may additionally be connected to a tank level sensor 50 for determining the amount of fuel left in a connected fuel reservoir, such as a liquid propane tank 66. An icon, such as icon 67 may graphically or numerically illustrate the amount of fuel remaining. Microprocessor 36 may be connected to a tank level sensor (described below), and may be configured to shut off valves such as valve 38 when the tank is low or empty.

Tank 66 may be provided with a regulator 68 for ensuring that the pressure of the fuel provided to barbeque 20 is at a constant pressure, regardless of the flow setting of the valves (such as valve 38). Hence, even though valve 38 may be in a low-flow state, the pressure of the fuel transmitted therethrough to barbeque 20 may be at generally the same pressure as the fuel transmitted when valve 38 is in a high-flow state. The valves, such as valve 38 and valve 60, do not include a regulator or have a regulator associated therewith. This may be advantageous because it may reduce the chance that a "flame-out" occurs within barbeque 20 due to insufficient fuel pressure. It may also reduce the cost of valves 38 and 60. Since fuel flow is not regulated by pressure, the valves need not include a regulator. A fuel pressure of about 11 inches water column (WC) may be employed for propane and about 7 inches WC for natural gas. This may vary depending on requirements and government or other regulations which may vary by jurisdiction.

Figure 5A:
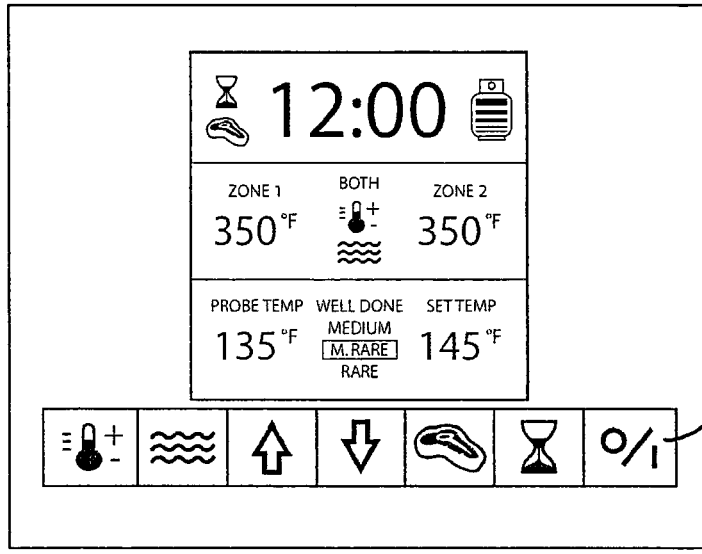
FIGS. 5A to 5P illustrate various features of an embodiment of a liquid crystal display of the temperature control apparatus.

FIGS. 5A to 5T illustrate an example of a configuration for a LCD screen 52 of the temperature control apparatus 32. As noted, the particular layout, font, figures, and functionality included may be varied, added to, or removed. For example, functionality relating to a meat probe or tank level sensor may be eliminated or removed to reduce cost or for some other reason. At a minimum, means for inputting a desired temperature set-point may be included, unless the system is designed to always maintain the same temperature, such as for a commercial application. Features highlighted for LCD display 52 are shown darkened in the figures for ease of illustration. The various features may be darkened or not in an embodiment. Different colours and lighting, including back-lighting, may be employed to improve readability and usability.

FIG. 5A shows an on/off button graphic 53. Pressing screen 52 about this graphic, causes the temperature control apparatus 32 to switch off and on, as desired. As noted, when temperature control apparatus is in an "off" state, barbeque 20 may operate as a conventional barbeque. Alternatively, barbeque 20 may be configured without one or more, or all of knobs 30. In this configuration, temperature control apparatus 32 may control all fuel flow to barbeque 20. Valves 38 may be configured to include an "off" setting, or fuel flow may be switched off, for example manually, at tank 66, or at some other fuel source that is connected to barbeque 20. In this alternative configuration, barbeque 20 may be difficult to achieve a desired temperature without turning temperature control apparatus 32 on.

Figure 5B:
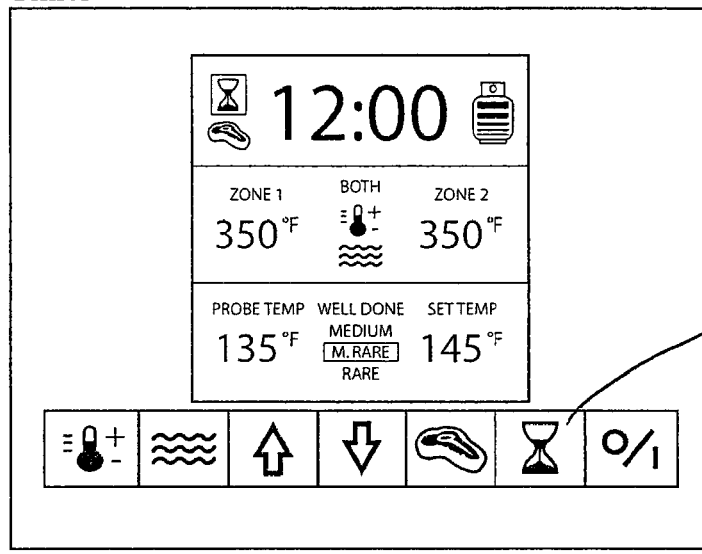

FIG. 5B illustrates a countdown timer that may be included. The countdown timer may be set in a manner similar to that described for the temperature setting. The countdown timer may be used to turn off or change fuel flow after a certain period of time. Alternatively, it may be used as a simple timer. This feature may be activated by pressing the hour glass icon 70 and adjusting the desired time by pressing the arrow keys 56 and 58.

Figure 5C:
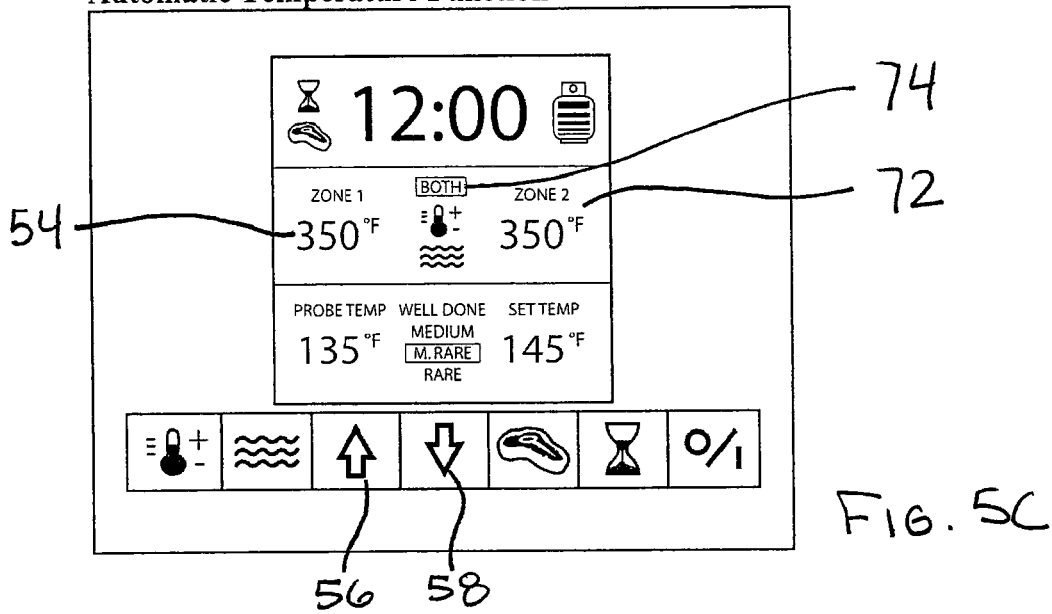

FIG. 5C illustrates icons of display 52 that may be used to set a temperature, as described above. If temperature control apparatus 32 is configured to control two zones (it may be used for just one zone or barbeque), then zone control button 54 may be pressed, followed by increase/decrease arrows 56 and 58 in order to enter a desired temperature set-point. A similar operation may be followed for a second zone by pressing second zone button 72. If both zones are to have the same temperature set-point, then button 74 may be pressed and both zones desired temperatures will be set at the same time by pressing increase/decrease arrows 56 and 58.

Figure 5D:
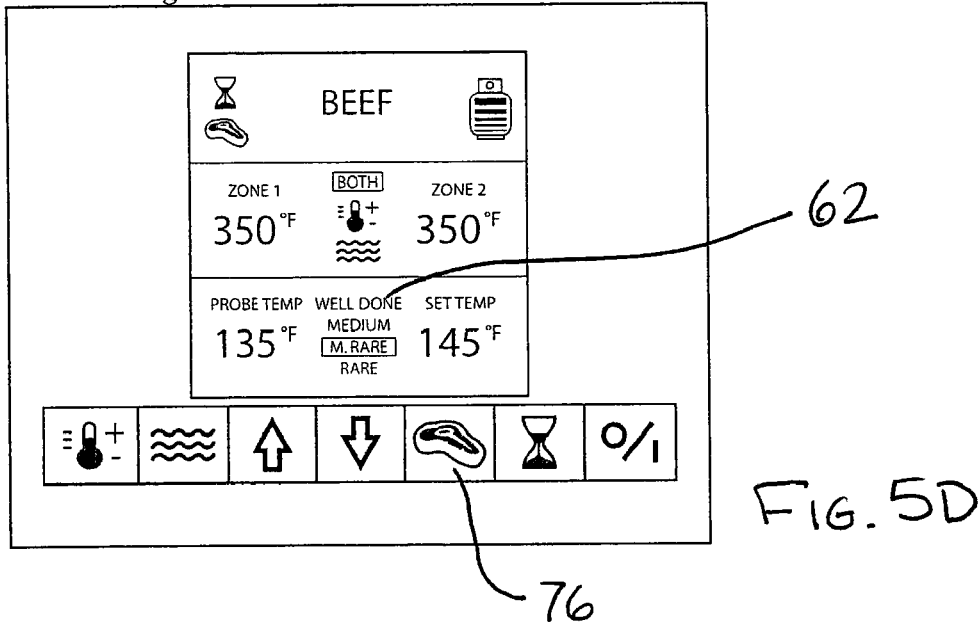

FIG. 5D includes a food-type entry input 76. This may be used to toggle or scroll through different meat types, and to enter a desired doneness for the food as illustrated at 62. Microprocessor 36 may be encoded with any variety of food types and characteristics to be entered via display 52.

Figure 5E:
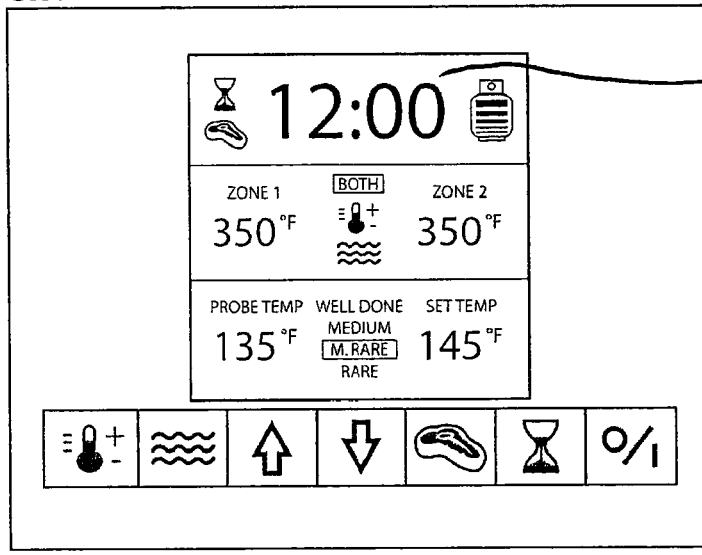

FIG. 5E illustrates setting of a clock feature 78. Microprocessor 36 may be configured to maintain display of clock 78 even when display 52 has been switched off. Clock 78 may be set by pressing in the area of clock 78 and the up or down arrow at the same time in order to increment or decrement the clock setting. It should be noted that all functions are preferably configured to require simple single button sequential pressing to avoid the need for a separate clock icon. Both the clock and arrow areas of display 52 are pressed at the same time for setting. However, an alternative configuration could be employed so that a clock icon is pressed and the arrow keys subsequently pressed in order to set the clock.

Figure 5F:
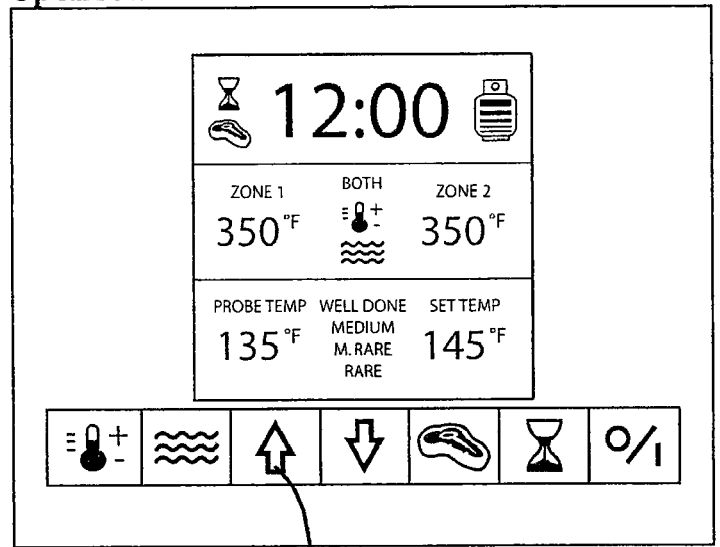
Figure 5G:
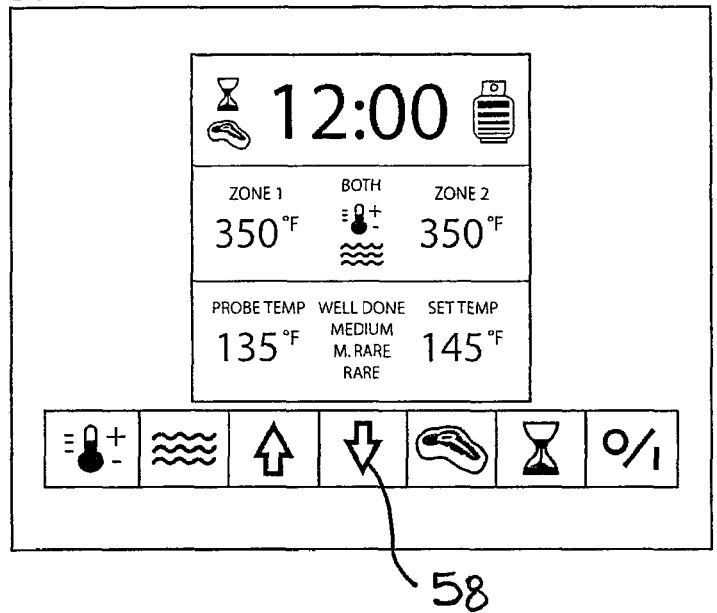

FIG. 5F illustrates employing the increase icon 56, and FIG. 5G illustrates using the decrease icon 58. These icons are used to increase and decrease values associated with the various functions of the temperature control apparatus 32.

Figure 5H:
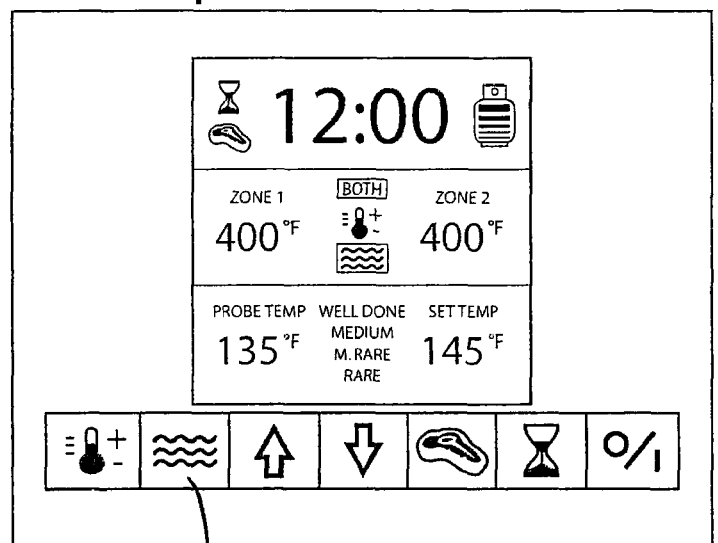

FIG. 5H illustrates a preheat function that may be encoded into microprocessor 36. A preheat button 80 of display 56 may be pressed. This causes microprocessor 36 to activate valve 38 to a high setting so that zone 1 (and any other zone activated, in which case additional valves are activated).

Valve 38 is activated to a high flow rate so that the associated zone in barbeque 20 quickly achieves a predetermined preheat temperature. In the present example, a preheat temperature of 400° F. is pre-programmed in microprocessor 36 as the preheat temperature. Any other temperature may be pre-programmed as a preheat temperature. Alternatively, temperature control apparatus 32 may be configured, including screen 52, to have a manually settable preheat temperature. Once the preheat temperature is reached, the temperature control apparatus may beep one or more times, at intervals if desired. For example, the temperature control apparatus 32 may beep for a period of 5 seconds every minute for 5 minutes.

Figure 5I:
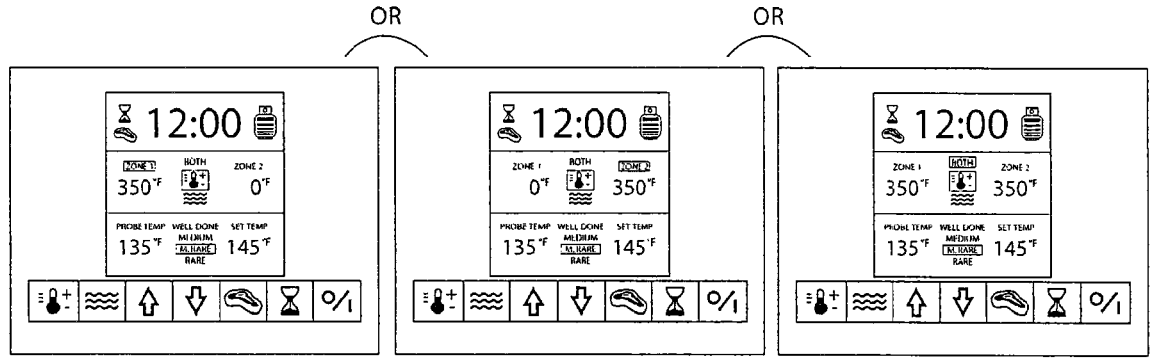
Figure 5J:
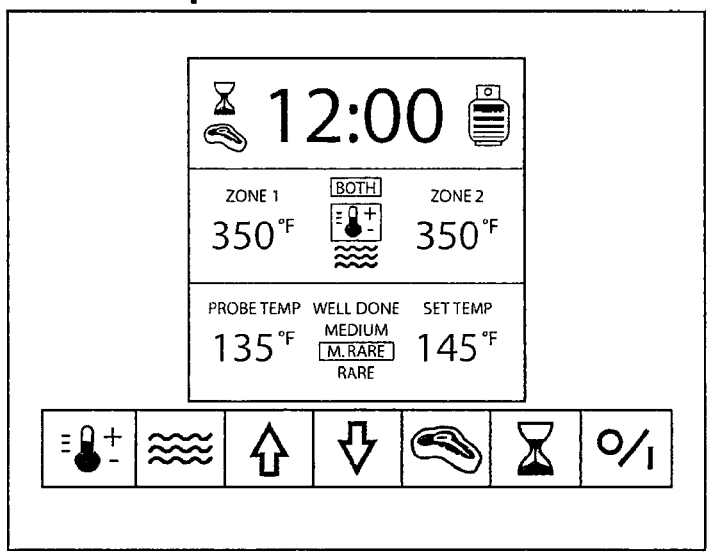
Figure 5K:
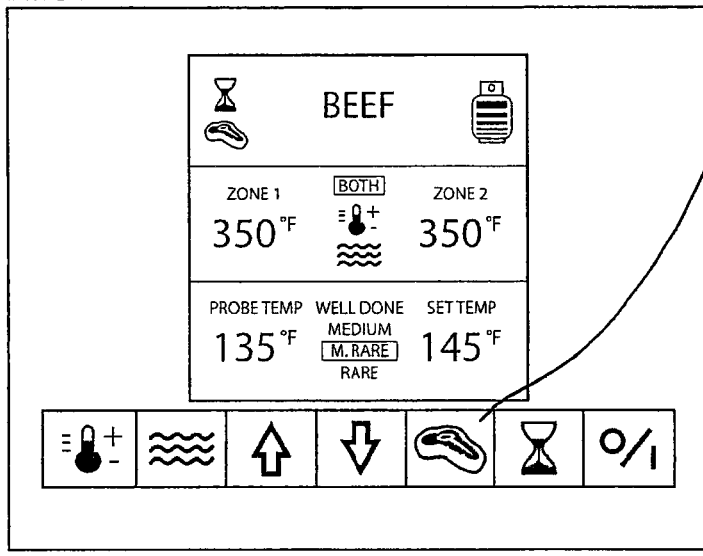
Figure 5L:
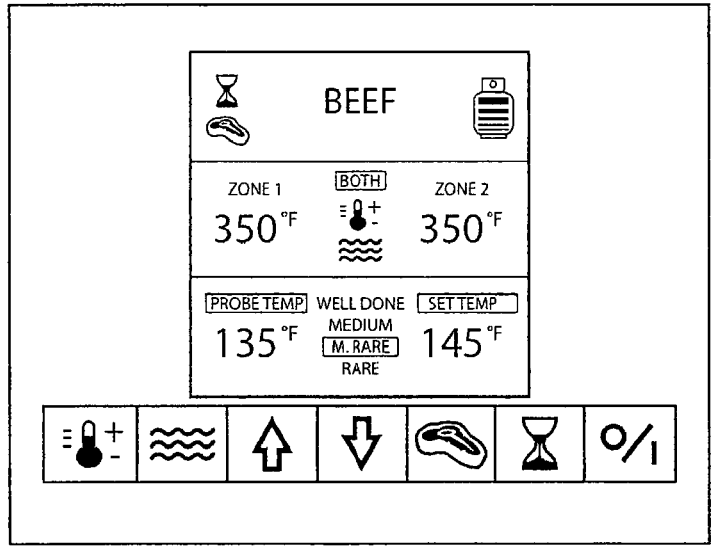
Figure 5M:
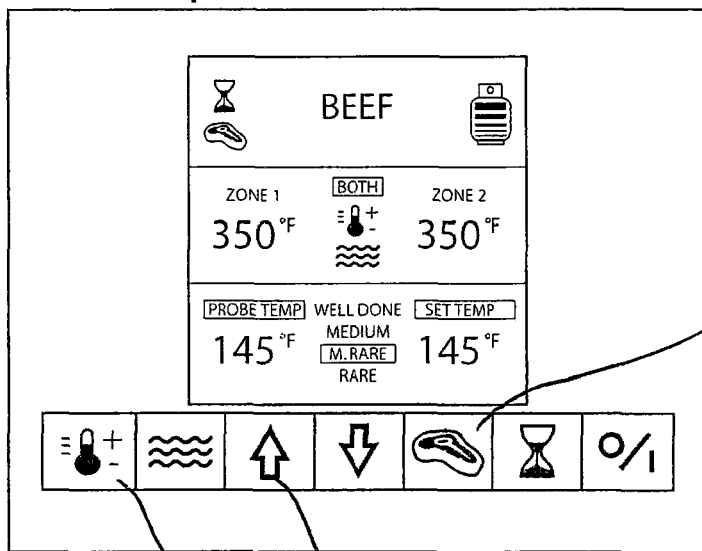

FIG. 5M illustrates a food-specific function that may be coded into microprocessor 36 and implemented into display 52. A food icon 76 may be used in conjunction with a probe such as a thermocouple meat probe 46 (see FIG. 3). When the meat probe reaches a desired temperature, the temperature control apparatus 32 may issue a beep. When the probe reaches a temperature over the set-point (for example, 5° over the set-point, a continuous or repeated beep may issue). A sample table of goal temperatures for various food items follows. These values may be pre-programmed into microprocessor 36. Any other of a wide range of values may be pre-coded for use with different types of foods or cooking scenarios. Optionally, temperature control apparatus 32 may be configured to enable coding of values by a user. In such case, a random access memory, such as a stable flash memory may be employed in the temperature control apparatus.

|  | Well-Done | Medium | Medium-Rare | Rare |
| --- | --- | --- | --- | --- |
| Beef | 170° F. | 160° F. | 145° F. | 135° F. |
| Lamb | 170° F. | 160° F. | 145° F. | 135° F. |
| Veal | 170° F. | 160° F. | 145° F. | 135° F. |
| Chicken | 180° F. | | | |
| Turkey | 180° F. | | | |
| Pork | 170° F. | | | |
| Fish | 160° F. | | | |
| Hamburger | 160° F. | | | |

FIG. 5K illustrates entering a food type by repeatedly pressing the food icon 76. FIG. 5K at the right side thereof illustrates the various food types that will be displayed as food-type icon 76 is pressed.

FIG. 5L illustrates display 52 after it has been set to cook beef medium-rare. FIG. 5L illustrates that the probe temperature is below the set temperature of 145° F.

FIG. 5I further illustrates temperature control setting. In the present example, temperature may be set in five degree increments. However, the temperature control apparatus 32 may be configured to enable other increments including fractions of a degree. The temperature control apparatus 32 may be configured to sound an alarm or to flash a light once a target temperature has been reached.

FIG. 5J illustrates a condition when the target temperature cannot be reached after a certain period of time. The period of time may be predetermined by encoding microprocessor 36 accordingly. For example, if a set-point temperature is not achieved within 10 minutes, then an alarm, whether visual, auditory or other sensory indicator, may be activated to indicate to a user that the target temperature cannot be achieved, either because the temperature is too high or too low. The goal temperature may then be reset accordingly or the barbeque 20 may be examined to determine whether there is a fault.

Figure 5N:
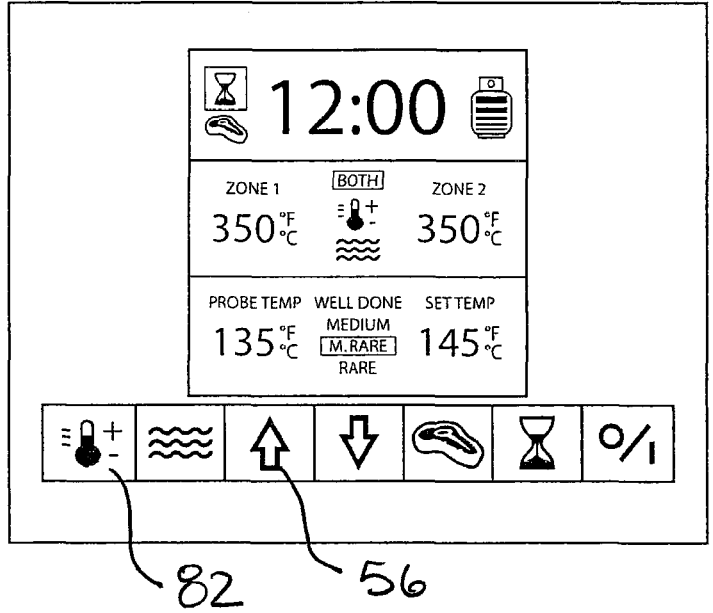

FIG. 5N illustrates that up button 56 may be used in conjunction with automatic temperature control button 82 to toggle between different temperature units, such as Celsius and Fahrenheit.

Figure 5O:
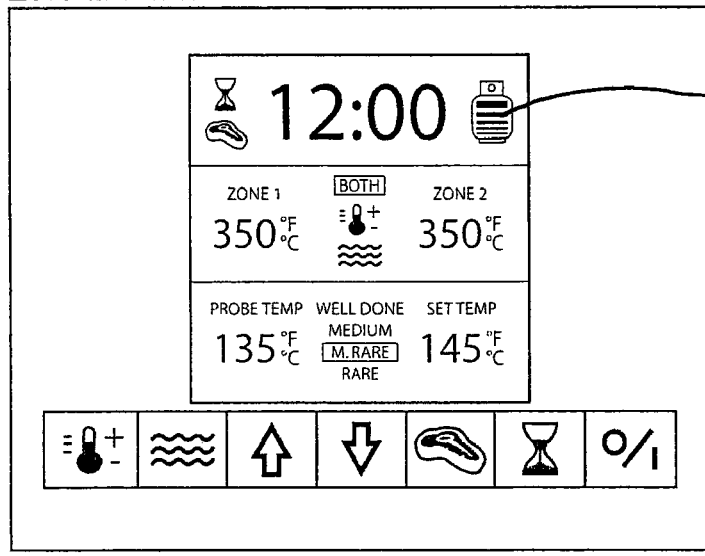
Figure 5P:
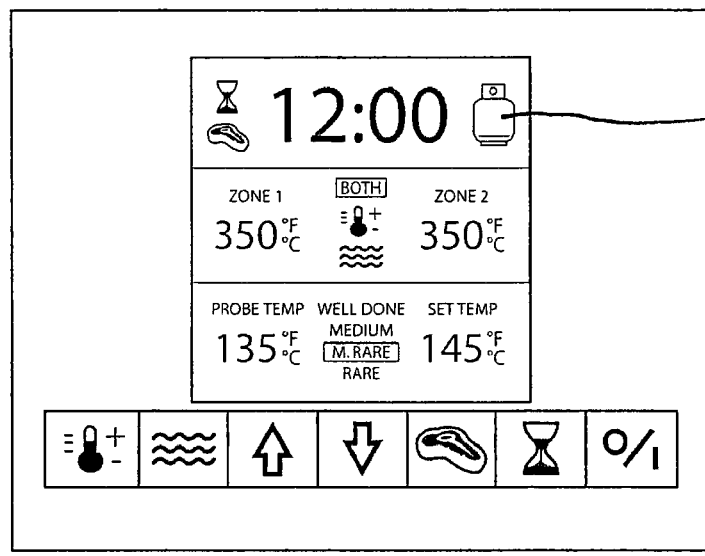

FIG. 5O illustrates the fuel tank level icon 67 described above. Icon 67 may be configured to illustrate a progressively empty fuel vessel as illustrated in FIG. 5P. Processor 36 may be programmed to query the tank level sensor 50 at a predetermined interval such as 30 seconds. Tank level icon 67 may then include one or more bars corresponding to a predetermined level. Depending on the tank level value returned by tank level sensor 50, a given number of bars may be activated in icon 67 to illustrate graphically the amount of fuel remaining. Alternatively, a number corresponding to the level of the fuel tank may be illustrated. An alarm may be activated when the fuel tank 66 reaches a predetermined level, such as 10%.

FIG. 6 is an isolated view of barbecue base 24 and console 28. FIG. 6 illustrates that the barbecue 20 may include an auxiliary burner (not shown) connected by conduit 84. The present embodiment may include three burners 86, 88 and 90. Barbecue 20 may be configured to have any number of burners, including just one burner, or multiple burners. If just one burner, such as burner 86, or 88, is employed, then temperature control apparatus 32 will typically include just one valve assembly, such as valve assembly 38. Each burner 86, 88 and 90 may define separate heating zones within barbecue 20. In such case, barbecue 20 may be thermally separated into three different zones. In the embodiment shown in FIG. 6, barbecue 20 includes just two heating zones. Burners 86 and 88 may be associated with heating zone 1 and burner 90 may be associated with heating zone 2. Heating zones 1 and 2 may be separated by a divider (discussed below) that is resistant to thermal transmission. This may ensure that zones 1 and 2 may be controlled independently to have different temperatures, or they may be controlled relatively independently to have the same temperature. Burners 86, 88 and 90 may have different configurations, or the same configuration, and they may include the burner types illustrated, or any other burner known in the art, including those conventionally used for gas fuelled appliances, such as barbecues.

FIG. 7 illustrates an isolated rear view of console 28 and associated components of barbecue 20, including components of the temperature control apparatus 32. FIG. 7 should be viewed in conjunction with FIG. 6. When temperature control apparatus 32 is off or not activated, control knobs 30, 92 and 94, each associated with a respective burner 86, 88 and 90, may be used to control in a conventional manner the flow of a combustible fuel in a conventional manner. Each control knob includes an associated valve. Any suitable control knob and valve combination may be used, including those well known in the art. Additional control knobs may be included, such as control knobs 96 (e.g., for a rotisserie), 98 and 100. Control knob 98 may be used to control the flow of fuel to an additional burner or other appliance via conduit 102 which connects to conduit 84 (shown in FIG. 6).

Each valve, such as valve 38, associated with a zone may have a minimum flow rate that is similar to or equal to the sum of the flow rates of the associated controls, such as controls 30 and 92. For example, if controls 30 and 92 each have a minimum flow rate of 5,000 BTUs, then valve 38 preferably has a minimum flow rate of 10,000 BTUs (i.e., 5,000+5,000). This configuration permits valve 38 to supply a minimum amount of fuel to controls 30 and 92. If the minimum flow rate of valve 38 is made lower than the sum of the minimum flow rates of the associated control or controls, then it is possible for any associated burner, such as burner 86 or 88 to "flame out" due to an insufficient fuel supply. The minimum flow rate for valve 38 may be in the range of 10,000 BTUs, and the maximum flow rate may be in the range of 25,000 BTUs.

Higher and lower values may also be suitable depending on the configuration such as the volume of the barbeque to be heated.

Control 30 may be configured to include an off position in which the flow of fuel to burner 86 is inhibited. The off position may be a discreet position. For example, control 30 may click or snap into an off position. Control 30 may also have discreet or continuous high and low positions, permitting high and low rates of fuel flow to burner 86. In an embodiment, control 30 must be pushed when it is in an off position before it may be turned to a high or low position. Once in a high, low, or intermediate position, it may be released. Control 30 may then be rotated between high and low positions, without pushing it, in order to set a fuel flow rate that is high, low or at some intermediate position. To return to an off position, control 30 may be pressed and turned to the off position. The other valves 92, 94, 96, 98 and 100 may be similarly configured.

In the illustrated embodiment, the controls, such as controls 30, 92 and 94, that are associated with the temperature control apparatus 32, may also be used at the time that the temperature control apparatus 32 is activated. For example, when control 30 is put to an intermediate flow position, temperature control apparatus 32 may operate valve 38 to cycle gas flow between the low flow rate of valve 38 and the intermediate flow rate as set by control 30. If control 30 is placed to a high flow rate setting, then the temperature control apparatus 32 may operate to achieve and maintain temperatures within a broader range. When temperature control apparatus 32 is used, all associated valves (30, 92 and 94) will typically be placed by a user to a high flow position to provide the temperature control apparatus 32 with the largest possible range of operation.

Temperature control apparatus 32 may also operate if all control knobs, such as control 30 are eliminated. In such case, flow of the fuel may be turned off as a shut-off valve 106 of regulator 68. All control knobs may be conveniently connected via a manifold 108. When the temperature of more than 1 zone is to be controlled, then the controls and associated burners for a given zone may be connected via separate manifolds. In the present example, a second manifold 110 may be included for zone 2. This can be seen in FIG. 7. Manifold 108 may connect burners 86 and 88, and associated controls 30 and 92. Manifold 108 may also be connected with valve 38. In this way, the temperature control apparatus 32 may separately control the burners in zone 1 via valve 38, and the burners in zone 2 via valve 60

Temperature sensors such as thermocouples 42 and 44 may be located within each of zones 1 and 2. The thermocouples may be mounted to a side of base 24, or any other location. Thermocouples 42 and 44 are preferably placed to avoid contact with any drippings or splatter from food cooked within barbecue 20.

Barbecue assembly 20 may additionally include an igniter for igniting fuel communicated to the burners, such as burner 86. Alternatively, a match or other suitable means may be used to ignite the burners.

FIG. 8 shows barbecue 20 without closure members 112 (as shown in FIG. 1). FIG. 8 illustrates a possible placement of tank sensor 50. Tank sensor 50 is illustrated in greater detail in FIGS. 9A to 9D. Tank sensor 50 may be used to determine the fuel level in a tank 66 associated therewith. Tank sensor 50 may be connected to temperature control apparatus 32 via a connector 114. A sensor such as that manufactured by Sensotech Inc. of 1250 Rene-Levesque Boulevard, Montrol, Quebec may be suitable, or as disclosed in Patent Corporation Treaty application no. PCT/CA2005/001935 and U.S. patent application Ser. No. 11/029,415 and other applications claiming sensor devices and which are owned Sensotech Inc., the disclosures of which are incorporated herein by reference.

Figure 10:
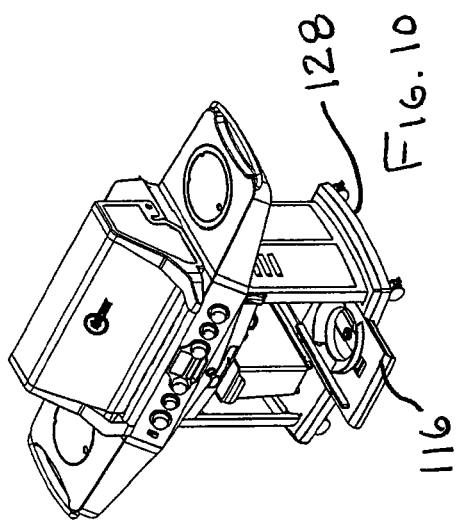
FIG. 10 illustrates an isometric view of the barbecue of FIG. 1 illustrating a tank support in an extended position.
Figure 10A:
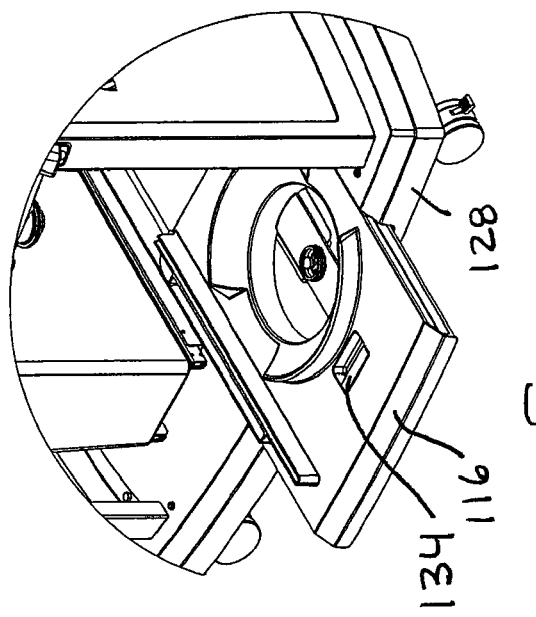
FIG. 10A is an enlarged view of the tank support of FIG. 10.
Figure 11A:
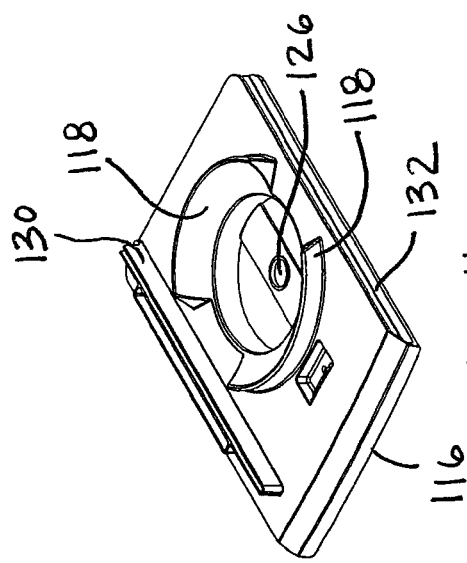
FIG. 11A is an isolated isometric view of the tank support of FIG. 10.
Figure 11D:
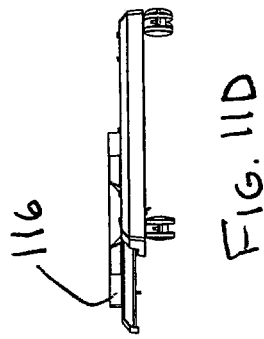
FIGS. 11B to 11D present different isolated views of the tank support of FIG. 10 and a shelf of the barbecue of FIG. 10.
Figure 11B:
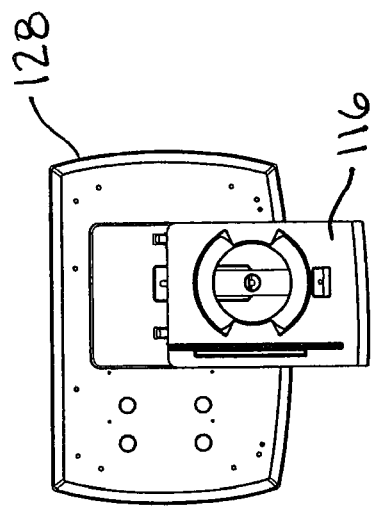
Figure 11C:
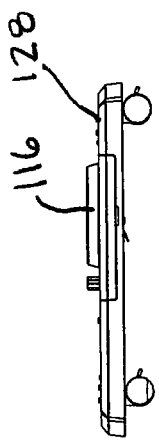

FIGS. 10 and 10A illustrate a support for a fuel reservoir such as fuel reservoir 66 (see also FIG. 12). As further illustrated in FIGS. 11A to 11D, support 116 includes at least 1 protrusion 118 that corresponds to a lower portion 120 (see FIG. 12) of tank 66. Support 116 may additionally include portions defining a void 122 for receiving a stand 124 of tank 66. Void 122 may be configured as a continuous slot (not shown) for receiving an edge of stand 124.

Tank support 116 may additionally include a rebate 126 for receiving sensor 50. Rebate 126 may be configured to conform to a perimeter of sensor 50 so that sensor 50 engages edges defining rebate 50 in a snap fit. Alternatively, rebate 126 may be configured for a friction fit, or may simply retain sensor 50 by gravity fit.

Tank support 116 may be formed integrally with a shelf 128 of barbecue assembly 20. This may make it difficult to install, remove, and replace tank 66. Accordingly, tank support 116 may be configured as a separate member movable relative to shelf 128. Tank support 116 may be mounted to two shelf 128 on rails, sliders or some other suitable arrangement. As illustrated in FIG. 10A, tank support 116 may be configured to slidably engage shelf 128. A stabilizer, such as rail 130, may be included to provide additional support and guidance to tank support 116 when it is moved relative to shelf 128.

Tank support 116 may also include a guide in the form of a rib for engaging a complimentary feature of shelf 128. Rib 132 may be located upon either side of tank support 116 to permit generally linear movement of tank support 116 relative to shelf 128. Rib 130 and rib 132 serve to discourage displacement or tipping of tank support 116 relative to shelf 128 when shelf 128 is moved for removal or replacement of tank 66.

Tank support 116 may additionally include a retainer or a lock such as latch 134. Latch 134 may be movable within tank support 116 so that it engages shelf 128 or a complimentary feature in shelf 128. As shown in FIG. 12, latch 134 extends generally perpendicular to a plane of movement of tank support 116 so that it may engage a corresponding feature (not shown) of shelf 128. Latch 134 discourages movement of tank support 116 relative to shelf 128 when tank support 116 is in engagement with shelf 128, and tank 66 is positioned for use. This arrangement may further discourage movement of tank 66 when barbecue 20 is operated.

FIG. 12 is a cross sectional view providing further illustration of both tank support 116 and the positioning of tank level sensor 50. Tank level sensor 50 preferably contacts tank 66 sufficiently that it may communicate and receive signals therewith in order to determine the amount of fuel within tank 66.

FIG. 13 illustrates barbecue 20 configured to have multiple zones, described above. By differentially controlling two or more of burners 86, 88 and 90 (see for example, FIG. 7), barbecue 20 may be provided with thermally differentiated zones therein. As shown in FIGS. 13A to 13D, and in an isolated view shown in FIG. 14, a divider such as divider 136 may be included with barbecue 20 to encourage or facilitate thermal differentiation between the various zones. In the example shown in FIG. 13, thermally differentiated zones 1 and 2 are illustrated. Even without divider 136, thermally differentiated zones may exist, for example, if a high flow rate fuel is provided to one burner, such as 86, and a low flow rate of fuel is provided, for example, to burner 90, then zone 1 may be generally warmer than zone 2. However, when lid 22 is closed, heat from the warmer zone will tend to transfer to the less warm zone, thus inhibiting differentiated cooking between zone 1 and zone 2.

Employing a divider, such as divider 136, in order to thermally separate two or more zones within barbecue 20 may permit thermally differentiated cooking. For example, a steak or other meat requiring a higher cooking temperature may be included in zone 1, whereas vegetables requiring a lower temperature may be included in zone 2. This may permit the cooking of both meat and vegetables at the same time, on the same barbecue, but at different temperatures. If a sufficient air seal is achieved between zones 1 and 2 when lid 22 is closed and divider 136 is in place, then the effect of flavours and other aromas produced by the cooking of food in one zone may be reduced in the other zone, thus preserving flavours of items cooked. However, an air seal is not required for divider 136 to operate.

Divider 136 may be made of a material that resists the transfer of thermal energy, such as a ceramic. However, thermally conductive materials, including metals, may be used because such materials will also serve to inhibit thermal transfer between zones 1 and 2. A combination of materials such as insulation sandwiched between sheets of metal, may also be employed.

Divider 136 may conform to an inside perimeter of lid 22 and base 24 when lid 22 is closed. In such configuration, divider 36 may divide or bifurcate the volume enclosed by base 24 and closed lid 22. Divider 136 may divide such volume into two equal volumes, or unequal volumes depending on cooking needs, such as the grill 26 area required, and the placement of burners, such as burners 86, 88 and 90.

FIG. 13 illustrates divider 136 in a plane generally perpendicular to grill 26 and generally perpendicular to a plane of the front of grill 20. Divider 136 may alternatively be placed in any other orientation that serves to thermally separate the internal volume of grill 20. Furthermore, multiple dividers 136 may be employed, for example, to thermally separate each of burners 86, 88 and 90. In the present embodiment, divider 136 may limit the effect of different temperatures in zones 1 and 2 on each other. For example, divider 136 may limit the effect of a temperature in zone 1 on zone 2 by not more than plus or minus 10 degrees Fahrenheit. In a further example, if the temperature of zone 1 is 300 degrees Fahrenheit, and a desired temperature of zone 2 is 200 degrees Fahrenheit, then zone 1 will generally, at most, raise the temperature of zone 2 to 210 degrees Fahrenheit with divider 136 in place. As noted below, the extent of this effect may depend on the material used for divider 136 and the extent to which divider 136 seals zone 1 from zone 2.

While divider 136 preferably conforms to an internal perimeter of combined lid 22 and base 24, it needs not completely conform to such internal perimeter. With reduced conforming to such internal perimeter, divider 136 may be less thermally inhibiting. Nevertheless, even a limited amount of thermal resistance by divider 136 to the transfer of heat between zones 1 and 2 may provide a suitable differentiation in cooking temperature in each of zones 1 and 2.

Divider 136 may be cut, stamped, moulded or otherwise formed as a single sheet, or as multiple sheets or pieces connected together. As noted, divider 136 may be made of a metal, a plastic, or some other substance that resists burning.

In an embodiment, divider 136 may be a single, generally continuous, generally planar sheet. Grill 26 may be formed of two separated grill parts (not shown). Divider 136 may then be placed between each grill part. The grill parts may serve to support divider 136.

Divider 136 may alternatively be provided with one or more rebates for avoiding features of grill 20 that may inhibit placement of divider 136. For example, divider 136 may be provided with one or more grill rebates 138. Rebates 138 may be dimensioned and located to receive a portion of grill 26 that may inhibit placement of divider 136 as shown in FIG. 13A. Rebates 138 may each receive one or more of the steel members that form grill 26. The positioning, number, and orientation of rebates, such as rebates 136, may be determined by the particular configuration of a given barbecue. For example, a barbecue may additionally include a warming rack 140. Accordingly, divider 136 may include a warming rack rebate 142 to accommodate warming rack 140, as seen in FIG. 13A. Warming rack rebate 142 may be configured to closely correspond to a portion of a perimeter of warming rack 140. As mentioned, rebates such as rebate 142 may generally correspond to a feature such as warming rack 140, and may permit a limited amount of thermal transfer, including air, to pass. The rebates, such as rebate 142, may be made large enough for easy passage of obstructions, such as warming rack 140, therein. If a given barbecue configuration does not include obstructions inhibiting the placement of divider 136, then divider 136 need not be provided with any rebates.

Rebates 138 in turn define tongues 144 (additional tongues may be defined such as tongues 146 and 148). The tongues together serve to inhibit movement of energy, air, fumes and other matter between the zones.

Divider 136 may include a stabilizer, attachment, or other feature to maintain its intended placement, and to permit divider 136 to resist movement when barbecue 20 is used. For example, a stabilizer 150 may be included at one or both ends of divider 136. Stabilizer 150 may be configured to abut a corresponding feature of grill 26. Stabilizer 150 may alternatively be located at an intermediate portion of divider 136. For example, stabilizer 150 may be placed adjacent to any part of rebate 142 to provide stabilization of divider 136 against warming rack 142. In the illustrated embodiment, 2 stabilizers 150 are provided to lie upon grill 26 in a direction transverse to a plane of divider 136. In this configuration, stabilizer 150 may inhibit lateral movement of divider 136. Stabilizer 150 is illustrated as being stick-like. Alternatively, stabilizer 150 may be provided at an angle less than 90 degrees relative to divider 146, in order to still impart stability to divider 136. Other protrusions from divider 136, may also be included so long as they provide a measure of support to divider 136 in order inhibit its movement when installed in barbecue 20. Alternatively, or additionally, divider 136 may be made to have a thickness approximating the spacing of grill 26. In this way, a friction fit may be formed between divider 136 and grill 26 when it is inserted therein.

Divider 136 may alternatively be permanently or temporarily attached to one or both of grill 26 and base 24. For example, divider 136 may be welded, caulked, screwed, bolted, or otherwise mounted to grill 26 or base 24, or both. Divider 136 may alternatively be attached to an inside surface of lid 22 so that it is moved in and out of place by opening and closing lid 22. In such configuration, the shapes of one or more of rebates 138 and 142 may need to be changed to accommodate this movement.

Support for divider 136 may alternatively, or additionally, be provided by a feature of base 24 (not shown). For example base 24 may include a receptacle or groove for receiving an edge of divider 136 in order to maintain its position. Such groove preferably has a width corresponding to, or marginally less than, a width of divider 136 to provide a friction fit when divider 136 is placed therein.

Divider 136 may alternatively constructed of two or more separate pieces. For example, a divider portion (not shown) may be installed below grill 26. A second complimentary portion may then be installed above grill 26. Such configuration could serve to reduce the need for any rebates, such as rebates 138. This in turn could reduce the extent to which thermal energy, air, and other matter can pass between zone 1 and zone 2. In a further alternative, divider 136 may be installed through a slot provided in base 24 (not shown). In this configuration, divider 136 may be installed in a generally opposite direction to the manner illustrated in FIG. 13. A retainer or other feature may be provided to prevent divider 136 from falling out of the slot and base 24. A similar feature could also be provided using a slot in lid 22.

FIG. 15 illustrates barbecue 22 and an internal storage system. The internal storage system may include a container 152 slidably mounted to shelf 128, for example via conventional telescoping rails 154, and a nestable container 156. Container 152 may be made of any suitable material, such as a plastic, and may be dimensioned to occupy a suitable portion of a volume defined by barbecue shelf 128, barbecue walls 158, doors 112 (see FIG. 1) and back (not shown). Storage 152 may have generally rectilinear dimensions, but may also be rounded or some other shape, as required. Container 152 may be slideably mounted to shelf 128 by providing a complimentary indent (not shown) in shelf 128 for receiving the bottom of container 152. Alternatively, container 152 may be mounted to a movable shelf (not shown). Container 152 may be used to store grill 26, or parts of grill 26, or other components of barbecue 20 or tools or appliances used in conjunction with barbecue. Container 152 may include a grip or handle 159 attached or integrally formed in some convenient location of container 152, such as a top edge thereof.

The storage system may also be provided with an insert, such as insert container 156. Insert container 156 preferably includes a lip 160 for supporting insert 156 upon edges 162 of container 152. Container 156 may additionally include a grip or handle such as an opening 164. Any other suitable handle may alternatively or additionally be applied.

FIG. 16A to FIG. 16D illustrate various views of the storage system.

Figure 17:
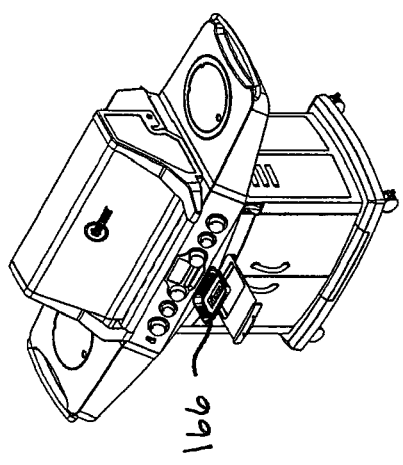
FIG. 17 is an isometric view of the barbecue of FIG. 1 and a grease receptacle.
Figure 17A:
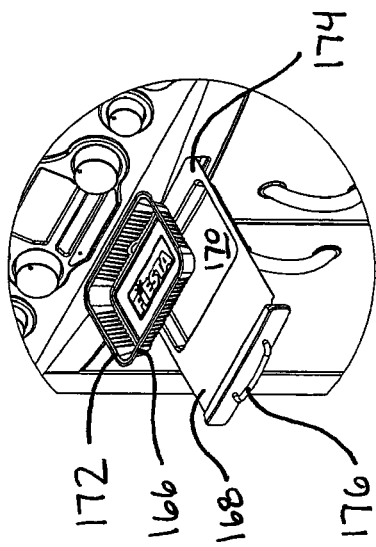
FIG. 17A is an enlarged view of the receptacle of FIG. 17.
Figure 18B:
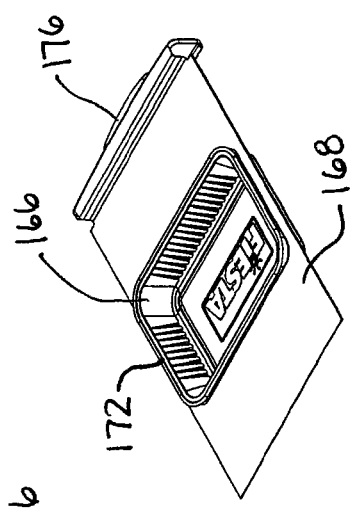
FIGS. 18A to 18D are isolated views of a shelf and receptacle of the barbecue of FIG. 17.
Figure 18D:
Figure 18A:
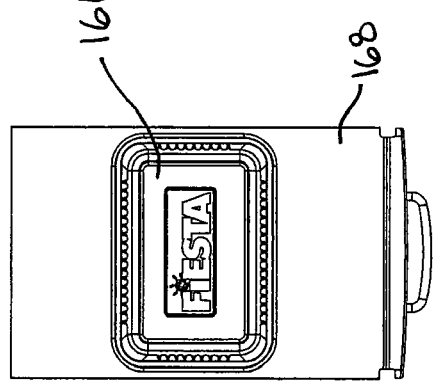
Figure 18C:
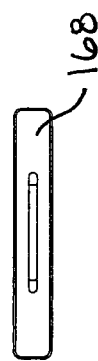
Figure 19:
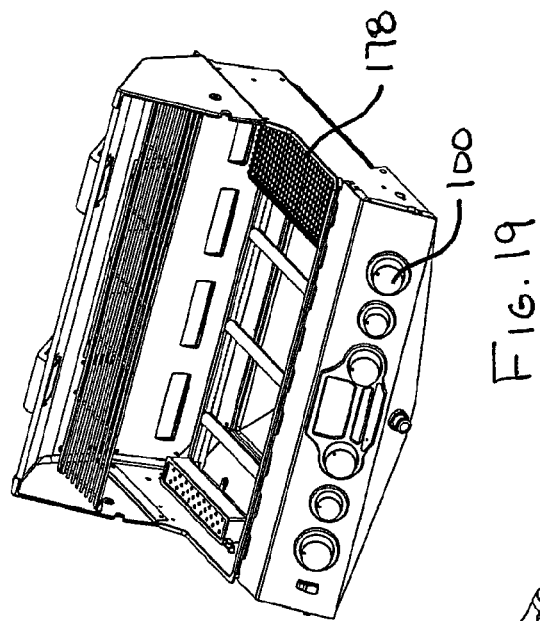
FIG. 19 is an isolated isometric view of the barbecue of FIG. 2 showing an infrared burner.
Figure 19A:
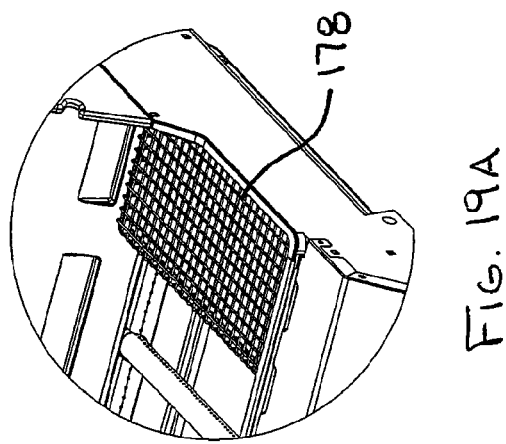
FIG. 19A is an enlarged view of the infrared burner of FIG. 19.
Figure 20B:
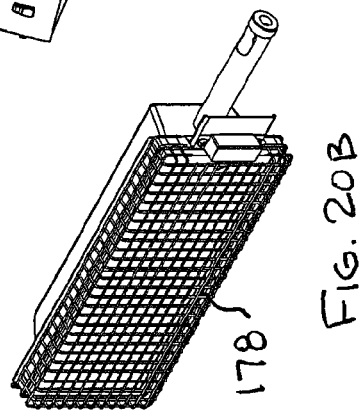
FIGS. 20A to 20D are isolated views of the infrared burner of FIG. 19.
Figure 20D:
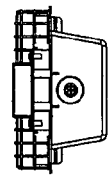
Figure 20A:
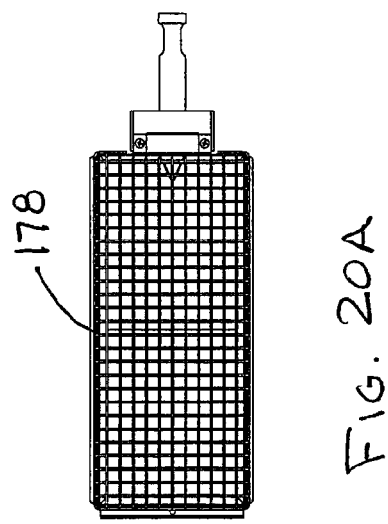
Figure 20C:
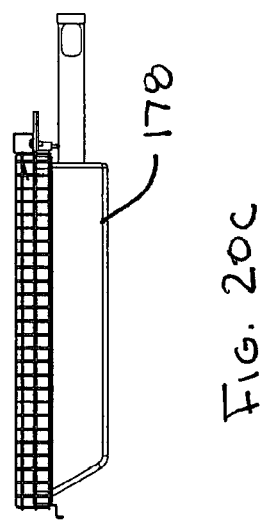

FIG. 17, 17A and FIGS. 18A to 18A illustrate a receptacle 166 for receiving grease, fat or other matter that may drip, fall or otherwise reside within base 24. An opening (not shown) within base 24 may permit the passage of such material into receptacle 166. Receptacle 166 may be any convenient size and shape to define a volume suitable for receiving an predetermined amount of material, such as fat or grease, that may be caught therein. For example, receptacle 166 may have the following approximate dimensions: about 1 inch deep by about 8 inches wide by about 5 inches long. In the preferred embodiment, receptacle 166 has dimensions of 1.1 inches deep by 7.785 inches wide by 5.315 inches long.

Receptacle 166 may be supported by a shelf 16A. Shelf 16A may define an opening 170 for receiving receptacle 166. Opening 170 may be a similar size and shape as receptacle 166. Receptacle 166 may additionally have one or more protrusions, which may be in the nature of a continuous lip 172 for inhibiting passage of receptacle 166 through opening 170. Lip 172 may traverse all or a part of a perimeter of receptacle 166.

Shelf 168 may be movable within a slot 174 of barbecue 20. Other slidable means or other feature permitting movement of receptacle 166 between a position for receiving matter to a position in which receptacle 166 may be removed, may also be employed. Shelf 168 may also be conveniently provided with a grip or catch such as in the nature of a handle 176.

FIGS. 19, 19A and 20A to 20D illustrate an infrared burner 178 that may be included in addition to burners 86, 88 and 90. Alternatively, infrared burner 178 may be employed alone or in conjunction with any other number of burners or even with additional infrared burners. Control knob 100 may be used to adjust the flow of fuel to infrared burner 178 (or another type of burner such as burner 179, shown in FIG. 6). Temperature control system 32 may be used to additionally control infrared burner 178. As seen in FIG. 7, control valve 100 is connected to valve 60 of temperature control system 32 (infrared burner 178 is not shown in FIG. 7 for ease of illustration). Accordingly, temperature control apparatus 32 may be used to control fuel flow to infrared burner 178 to achieve a desired temperature in zone 2 of barbecue 20. Infrared burner 178 may be placed in any convenient location, including above burners 86, 88 and 90 to enable infrared burner 178 to cook food, for example, placed on a rotisserie above grill 26 (not shown).

Figure 21:
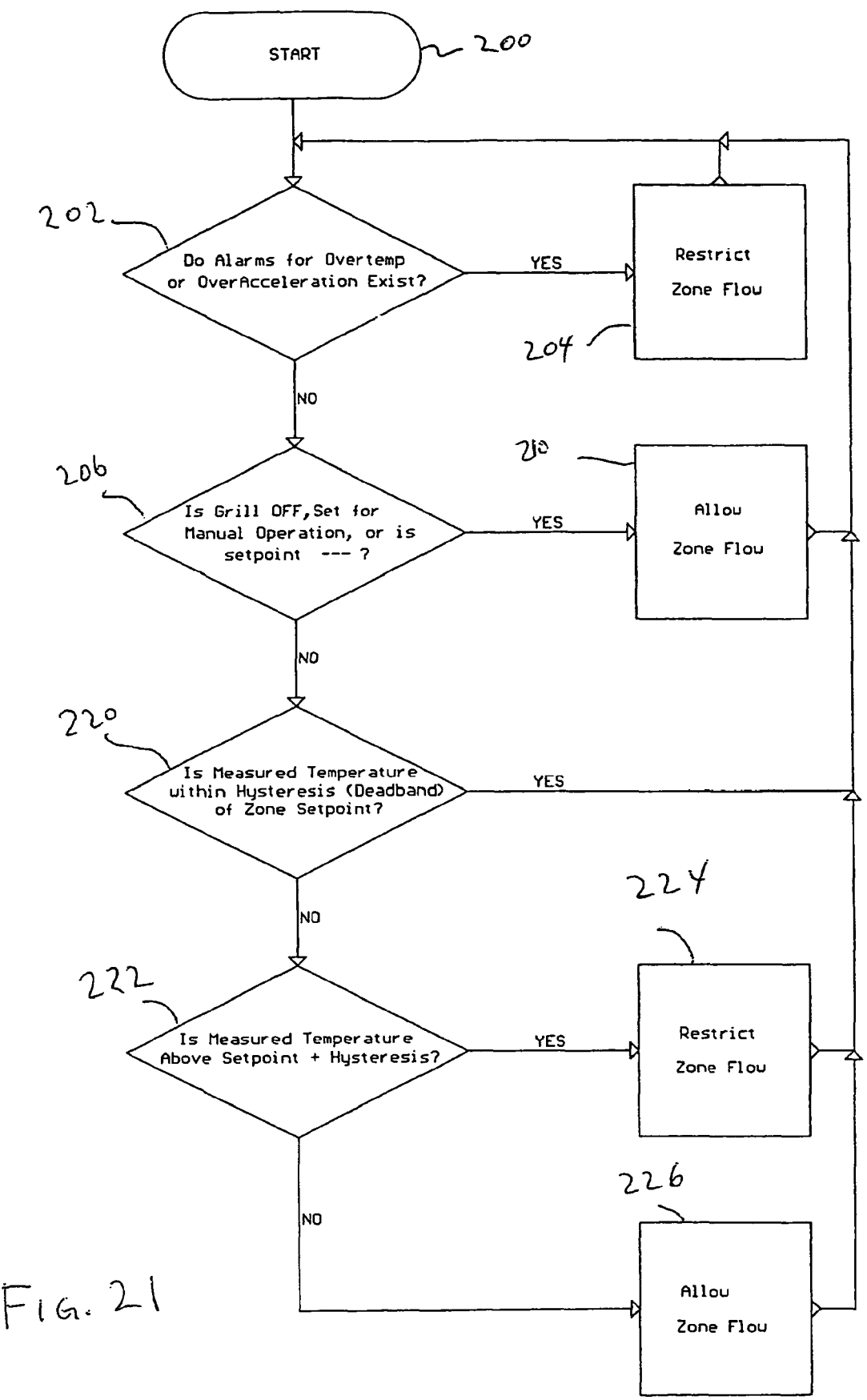
FIG. 21 is a schematic flow diagram of aspects of the function of the temperature control device.

The following focuses on the operation of the programming of temperature control apparatus 32, identifying aspects of the operation of the programmed software as shown in part in FIG. 21.

Software of temperature control apparatus 32 may be programmed to include the following functions described below. One or more of the evaluations made by the software may be done in a different order as set out below, or as shown in FIG. 21, as appropriate.

As illustrated in FIG. 21, the operation of the following disclosed aspects of the software may begin at step 200, for example, by a user turning on temperature control apparatus 32. At step 202, the software evaluates whether a condition exists in which an alarm should be activated due to barbeque 20 being too hot, or if the temperature measured within barbeque 20 increases or decreases in temperature at higher than a predetermined rate.

Step 202 may also evaluate whether any other safety or alarm condition exists. If such a condition exists, then the software instructs temperature control apparatus 32 to lower the flow rate of a connected fuel flow control device, such as valve 38. For example, valve 38 maybe set to a low flow rate following an alarm or error condition. This is done to reduce the amount of fuel provided in the event that something is wrong with the burning of fuel. If control valve 38 is configured to have an off state, then the software may cause valve 38 to turn off in step 204.

In step 206, the software evaluates whether barbeque 20 is set for manual operation. For example, temperature control apparatus 32 may include an input for a user to select between manual or automatic operation. Alternatively, if no desired temperature set point is entered, then temperature control apparatus 32 may default to manual operation. In such case, in step 210 valve 38 (or other flow control device) may be set to permit fuel flow, and is preferably set to permit a high flow rate. In this manner, a user may manually restrict fuel flow using one or more of control knobs, such as control knobs 30.

In step 220, the software assesses whether the measured temperature of barbecue 20 is within a predetermined range of a desired set point. For example, the software may determine whether the measured temperature is with 2° F. (for example, either 2° above or below a desired temperature set point). If the measured temperature is within this range then the software does not change the present flow rate of fuel, whether such flow rate is at a high rate, a low rate, or otherwise.

In step 222 the software assesses whether the measured temperature is higher than the temperature range described above. For example, it may evaluate whether the measured temperature is higher than the desired set point temperature plus a set amount, such as 2° F. If the measured temperature is above such total, the software may send an instruction to lower or otherwise restrict the flow rate of fuel (in some embodiments it may instruct fuel flow to be turned off). If the measured temperature is not higher than the predetermined range, fuel flow is maintained in step 226.

Additionally (not shown), a further step of evaluating whether the measured temperature is below the predetermined temperature range may be carried out. If the measured temperature is below such range then the flow of fuel may be increased, for example, by setting valve 38 to a high flow rate.

As can be seen from FIG. 21, the ultimate result of any step is a return to just after start step 200. This permits the continuous evaluation of the various states of barbeque 20. Evaluation may be performed by the software at any interval, for example, evaluation may be done many times per second, or evaluation may be done intermittently, such as every few seconds, every minute, or after a series of minutes. Of course, evaluation may be done at varying intervals, depending on the stage of cooking. For example, at start up, evaluation of the temperature state of barbeque 20 may be done every minute, however, once a temperature set point is approached, then evaluation of various states of barbeque 20 may be done more frequently. For safety, evaluation is preferably done frequently.

It is also possible to change the ordering of one or more steps. For example, the assessment of the alarm condition in step 202 may occur after any other step described. It is also possible to evaluate one step more often than other steps. For example, the measured temperature comparison in step 220 may be conducted two or more times for every one time that the manual operation evaluation is conducted in step 206. Alternatively, the alarm status evaluation of step 202 may be conducted after each and every other step in the flow chart.

The foregoing example has been described in the context of controlling temperature within a single area or volume of barbeque 20. As described, barbeque 20 may have one or more zones that may require different temperature control. In such case, additional zones may be controlled using similar steps as described herein.

Further description and examples of the functionality illustrated in FIG. 21 follow.

In an embodiment, if a set point temperature is below a preset minimum value (for example, a predetermined temperature in the range of 110° C. or 225° F.), the barbeque 20 may enter a manual mode where the flow rate may be manually set by the user and the temperature control apparatus 32 will not operate to control the valve 38. Otherwise, if a mode of the temperature control apparatus 32 is set by a user to "preheat", a predetermined preheat set point may be used as the target temperature instead of a user inputted desired temperature. Preheat may be pre-determined or coded in temperature control apparatus 32 at 200° C. or 400° F., or some other value for getting barbeque 20 in a state ready for cooking.

A user may also set the temperature control apparatus 32 to a keep warm setting. If keep warm is set and the keep warm set point temperature is below the user set point temperature, the keep warm set point will be used as the target temperature by the temperature control apparatus 32. The keep warm set point may be any suitable temperature that slows or stops the rate of cooking of food placed within barbeque 20. The temperature may be pre-programmed. The keep warm temperature may also be activated when a timer (such as illustrated in FIG. 5B) reaches zero. In response to the timer completing, the set point is reduced to the keep warm set point temperature.

In an embodiment, if none of the above conditions is true, the user inputted desired temperature set point may be used as the target temperature.

If the measured temperature of barbeque 20 is generally above about a desired target temperature plus a predetermined amount or hysteresis, the temperature control apparatus 32 changes the fuel flow rate to low flow rate. If the measured temperature is below the target temperature minus a predetermined amount or hysteresis, then the fuel flow rate may be changed to the higher flow rate.

The hysteresis may be a pre-programmed (for example during manufacture or coding) at 1° C. or 2° F., or some other higher or lower value suitable for cooking. As noted, higher numbers may lead to less accurate cooking, but may reduce the wear on any movable parts such as valve 38.

The software of temperature control device 32 may be pre-programmed to include the following features:

Off/Manual Mode—This mode permits a user to control the fuel rate manually.

Preheat Mode—The temperature control apparatus 32 controls the system to a predefined preheat set point and may sound or otherwise indicate an alert when the barbeque 20 is at a preheat temperature.

Grill Temp Mode—The temperature control apparatus 32 controls the barbeque 20 temperature to a user defined set point for each zone, when more than one zone is employed.

Timer Mode—This mode is similar to Grill Temp Mode, except that once the settable timer expires, the set points may be automatically reduced to the keep warm set points.

Probe Cook Mode—This mode is similar to Grill Temp Mode, except that once the probe temperature has reached the set point, the fuel rates of both zones may be reduced to minimum.

The software of temperature control device 32 may be pre-programmed to include one or more of the following safety features (the alarms may be auditory or visual or both, and may include a explanation of the nature of the alarm to be displayed on LCD 52):

1. Normal Alarm—this may be activated by temperature control device 32 when the measured temperature is not approaching the desired set point over time. In this situation, the software continues to control normally, but alerts the user with the display and an alarm, such as an audible beep, to the possibility of an undesirable condition such cover left open, or an out of fuel condition.

2. Overtemp Alarm—this may be activated by temperature control device 32 when the temperature, for example as measured by a thermocouple, exceeds a fixed programmable parameter. When this event occurs, an overtemp alarm may be triggered and the fuel flow rate reduced.

3. OverAcceleration Alarm—this may be activated by temperature control device 32 temperature, for example as measured by a thermocouple, increases or decreases (for example by ramping up or down) too quickly. In such case, an undesirable condition such as a grease fire may exist. The software of temperature control device 32 may then reduce the fuel flow rate, and may activate an alarm.

In an embodiment, temperature control device 32 may be programmed to include a probe cook mode. In the probe cook mode, a user may set the probe temperature set point based on the type of meat and the desired wellness. From the software, this is a series of pre-programmed set points used for each wellness state that may be selected (left to right in degrees Fahrenheit, the table illustrates the set point probe temperature for rare, medium rare, medium and well, respectively):

{135,145,160,170}, // BEEF
{135,145,160,170}, // LAMB
{135,145,160,170}, // VEAL
{180,180,180,180}, // CHICKEN
{180,180,180,180}, // TURKEY
{170,170,170,170}, // PORK
{160,160,160,160}, // FISH
{160,160,160,160}// HAMBURGER

In a yet further embodiment, the temperature control device 32 may be programmed to collect data from a tank level sensor that may provide an indication of the level of fuel in the tank and the time remaining at the current cook rate. This is done by monitoring the rate of change over time and predicting (extrapolating) the time when the tank will be out of fuel.

The foregoing discussion of a temperature control apparatus may include additional embodiments. For example, the subject apparatus could be applied to a gas fuelled apparatus having a different medium than air either within the apparatus or adjacent the apparatus.

For example, FIGS. 22 to 26 illustrate a frying apparatus 300. Frying apparatus 300 may be filled with a substance such as a cooking oil (e.g., corn, peanut or canola oils), or other medium such as water (e.g., for cooking by steaming, boiling, stewing). Fryer 300 may be used to cook any type of food. In the present example, fryer 300 is configured for cooking meat such as poultry, including turkey. In an embodiment, fryer 300 may be any suitable size for holding sufficient cooking fluid in order to cook meat or other food product.

Fryer 300 includes a vessel 302 having a capacity in the order of about 40 to 60 quarts (vessels of significantly different sizes are also contemplated, including "mini-fryers" that can be a cup or less, and industrial vats for commercial applications). Vessel 302 may include a lid 304 for reducing splatter, inhibiting heat dispersion, etc. Handles 306 may also be employed for stabilizing, lifting, or moving fryer 300.

Fryer 300 may include an integral or separate burner apparatus 308. In the present embodiment, burner 308 may be mounted within stand 310. One or more such burners may be employed. Burner 308 is typically located below, or adjacent, vessel 302 (though perhaps not as efficient, it may also be located beside vessel 302). In the present embodiment, burner 308 is located adjacent vessel 302 and below vessel 302. Alternatively, a burner (not shown), separate from stand 310, may also be placed, mounted or otherwise located in the space beneath vessel 302.

Vessel 302 is supported by stand 310. Stand 310 preferably has at least three legs 312 for stability, but it may have more legs, or supports (not shown; such as thickened struts or portions, bricks, etc.). Stand 310 provides space for burner 308 to draw oxygen and to provide energy to vessel 302.

Burner 308 may be connected to a fuel source 314, such as a propane tank. The fuel source in the present embodiment may be similar to the fuel source described for the embodiments above. Fuel source 314 may be connected to burner 308 via a conduit 316 which facilitates the passage of fuel between fuel source 314 and burner 308.

The flow of fuel between fuel source 314 and burner 308 is mediated by temperature control apparatus 318. Temperature control apparatus 318 may be configured as described in the embodiments above. Alternatively, apparatus 318 may be configured for simplified one-button operation via button control 326 (see the isolated view in FIG. 24). All input and/or control may also be provided via the screen 332 alone. Such simplified configurations may be convenient for the safe and efficient operation of devices having essentially a single purpose or function (e.g., a turkey fryer) as opposed to devices having multiple functions (e.g., a barbeque).

As in the other embodiments, the temperature control apparatus 318 is associated with a valve 328, which is controlled based on user inputs and/or pre-set temperature ranges, rules, safety features, heuristics etc. included in the temperature control apparatus 318. Additional valves may be used, particularly if multiple burners are included, or if multiple fryers, barbeques, etc. are controlled by a single temperature control apparatus 318.

Temperature control apparatus 318 may be connected to a thermocouple 320. In the present embodiment, thermocouple 320 is mounted through, to or adjacent to, vessel 302. It may be located for placement within the cooking medium (e.g., oil or water). Vessel 302 is typically made of a thermally conductive material. Accordingly, thermocouple 320 provides temperature control apparatus 318 with a generally accurate reading of the temperature, or thermal heat content, of vessel 302. Alternatively, thermocouple 320 could be placed within vessel 302, either through a wall of vessel 302, the bottom, via a lid 304, or in the opening below lid 304, etc. As mentioned, thermocouple 320, may also be conveniently placed adjacent, but not touching, vessel 302. It is expected that temperature readings may be less accurate the further thermocouple 320 is from vessel 302. If such an arrangement is employed, then a temperature adjustment factor may need to be employed to account for the distance between the thermocouple 320 and vessel 302.

Figure 22:
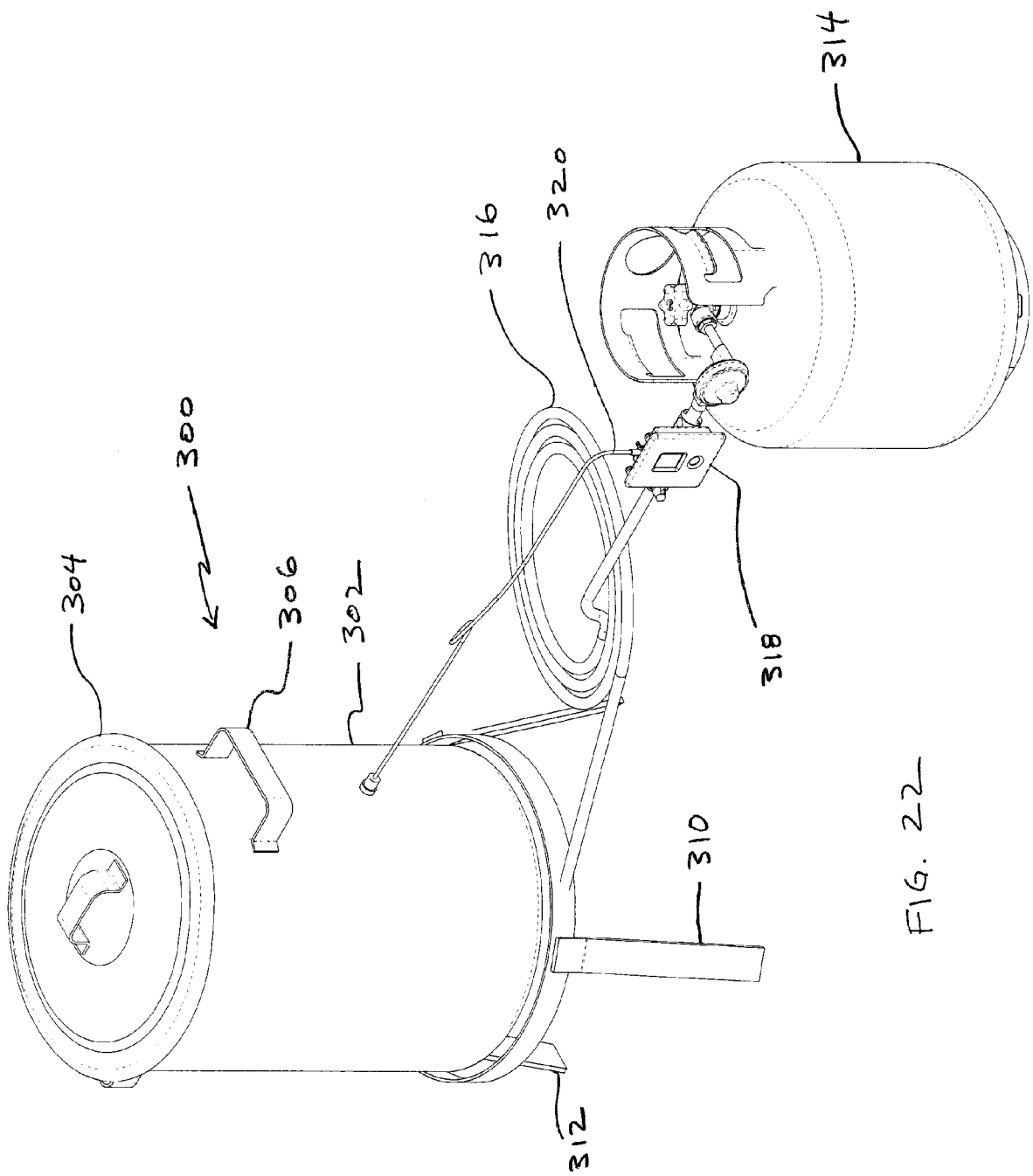
FIG. 22 is a isometric view of a further embodiment illustrating a temperature control device in conjunction with a vessel for containing liquid.
Figure 23:
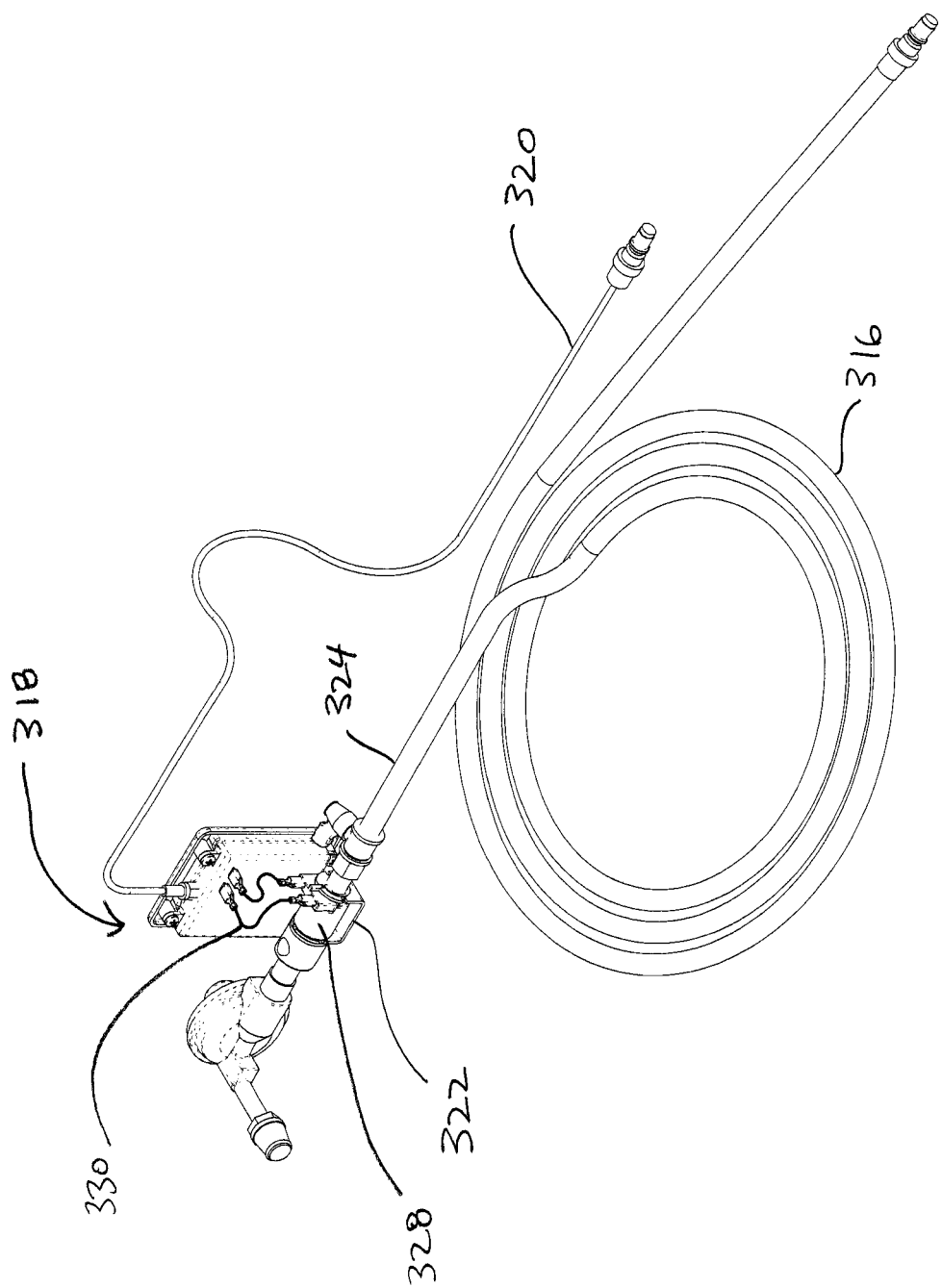
FIG. 23 is an isolated isometric rear view of a temperature control apparatus and associated components including a thermocouple and conduit.
Figure 24:
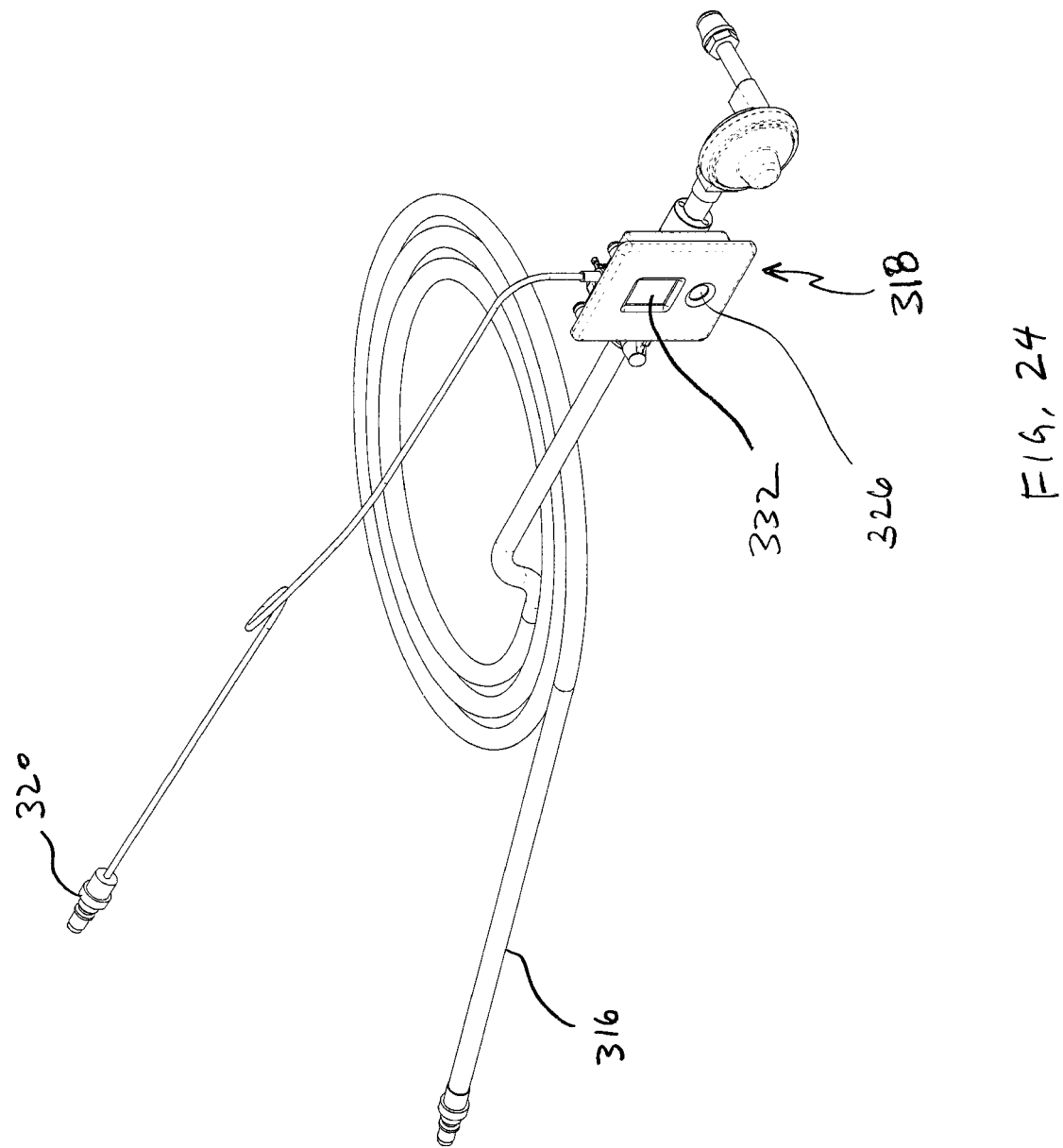
FIG. 24 is an isolated isometric front view of a temperature control apparatus and associated components including a thermocouple and conduit.
Figure 25:
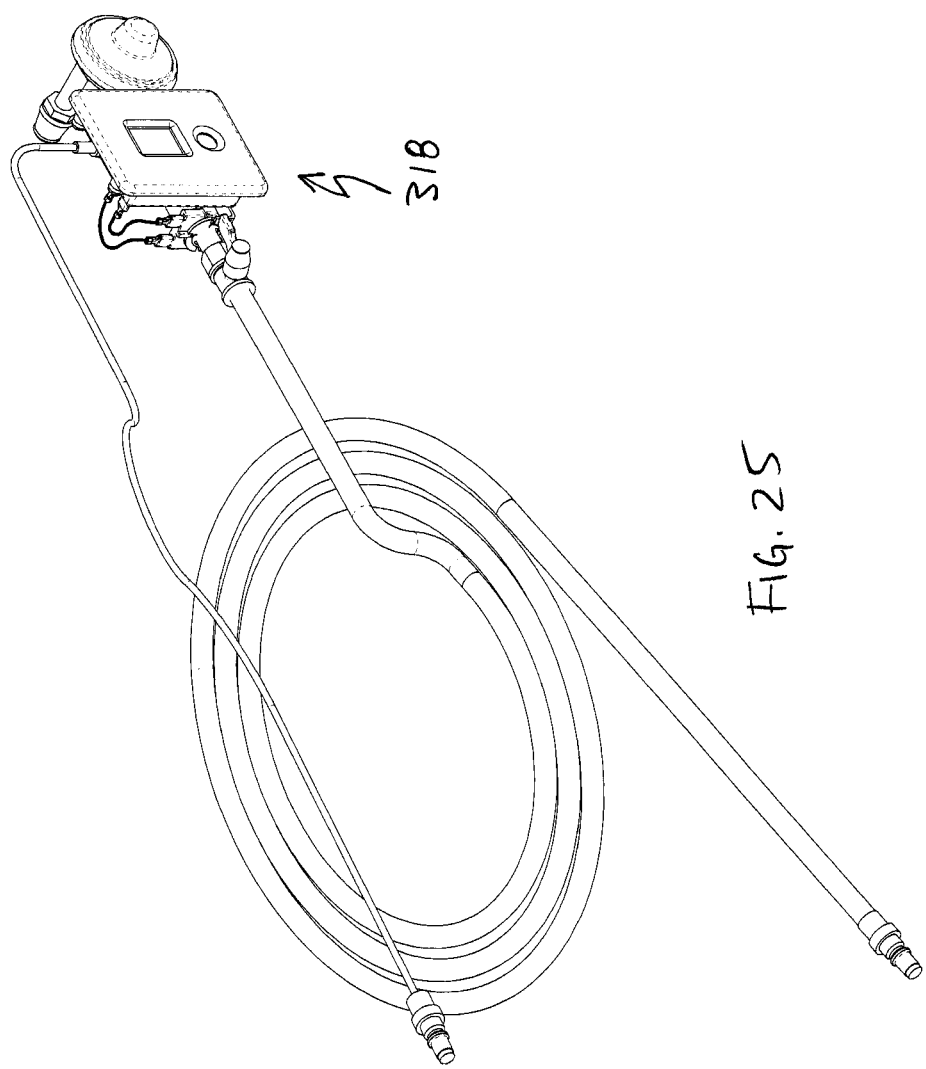
FIG. 25 is an isolated isometric front view of a temperature control apparatus and associated components including a thermocouple and conduit, viewed from a direction generally opposite to FIG. 24.
Figure 26:
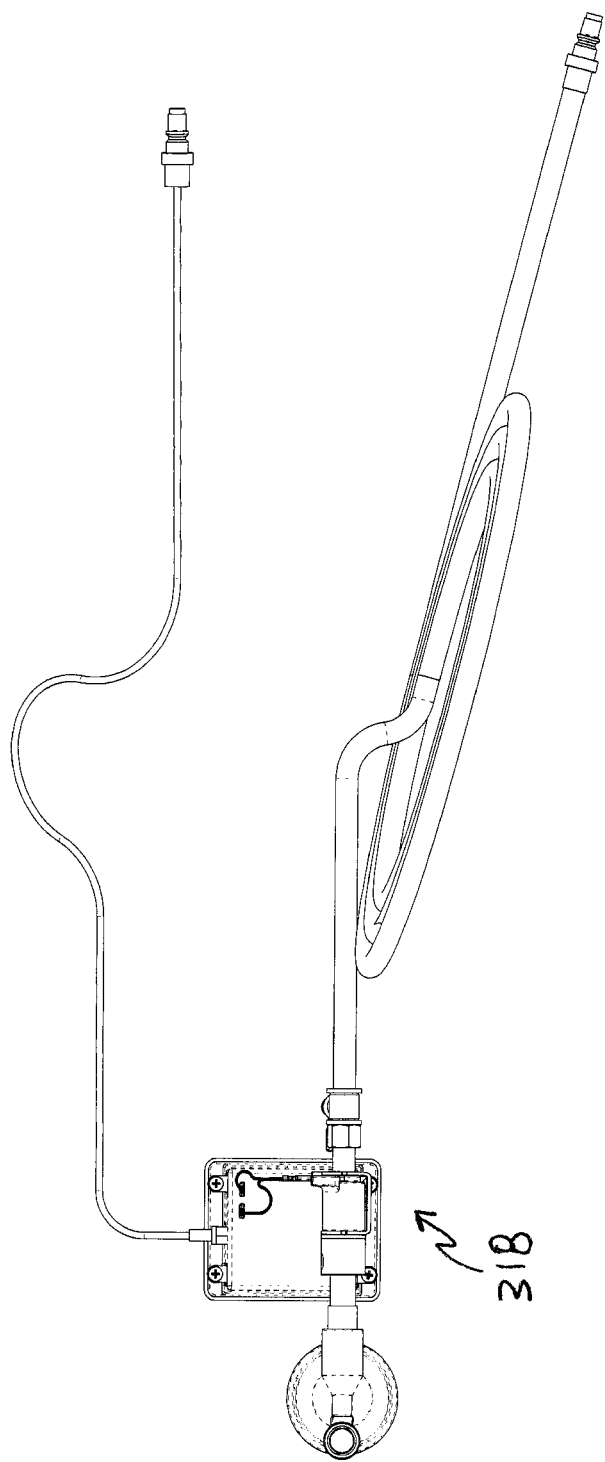
FIG. 26 is an isolated rear view of a temperature control apparatus and associated components including a thermocouple and conduit.

Given, that the operation of fryers and other devices may include elements of danger (e.g., inadvertent tipping, overheating, overflowing), the arrangement illustrated in FIG. 22 may address safety issues. Accordingly, a conduit 316 which is several feet long (together with a thermocouple 320 of similar length) could be employed to ensure that the temperature control apparatus 318 is sufficiently far enough away from vessel 302 that vessel 302 may be safely operated. For example, if vessel 302 were to spill, an operator should be a significant distance away to ensure that the operator is not burned from splatter or the ignition of the cooking medium (e.g., oil).

In order to facilitate a greater separation between temperature control apparatus 318 and vessel 302, the temperature control apparatus may be provided with a wireless thermocouple (not shown). Such arrangement further facilitates a safe separation of a user and the fryer 300.

Consistent with the description set out above, temperature control apparatus 318 may be configured for either manual or automatic control of the temperature of vessel 302. This serves to avoid frequent interaction with a hot vessel 302. For example, typical vessels 302 include a thermometer, such as a candy thermometer, and have a manual control dial connected to the burner apparatus. An operator is sometimes required to frequently verify the temperature by looking at the thermometer which is typically mounted to or located within vessel 302. Adjustment of the temperature is then made manually. Given that the frying apparatus is typically several hundred degrees Fahrenheit (for example, in the range of 300 to 350 degrees Fahrenheit), it is safer for an operator to stay away from the vessel 302 as much as possible while cooking a stake in place. There is also the possibility that vessel 302 will catch fire, overflow, tip, etc.

Temperature control apparatus 318 may be provided with functionality to turn off the flow of fuel in the event that the temperature of the cooking fluid in vessel 302 gets too hot (or near to a combustion temperature). For example, if the fluid exceeds a great determine set-point, such a 400 degrees Fahrenheit, the flow of fuel may be stopped by temperature control apparatus 318. This is intended to reduce the likelihood of any of the cooking medium catching fire, splattering, or entering a dangerous state. Different safety set points may be employed depending upon the cooking medium used (e.g., there may be a different safety/cooking set points for peanut oil and vegetable oil).

Temperature control apparatus 318 may be configured in set to stop or reduce the flow of fuel in the event that the temperature rises too quickly such as when vessel 302 overflows, catches fire, etc. A manual shut off valve may also be used to safely stop or limit fuel flow either to assist with cooking or in the event of a malfunction of apparatus 318 or other undesirable event when using the fryer 300.

A sudden drop in temperature may also trigger a shut-off or reduction of fuel flow by temperature control apparatus 318. For example, if vessel 302 tips over, the temperature may drop, and may drop quickly. Such drop in temperature and/or rapid drop in temperature, may be used to trigger temperature control apparatus 318 to turn off the flow of fuel in order to attempt to avoid a spill over catching fire if burner 308 were to be kept on.

There is typically a greater time lag when controlling the temperature of a liquid cooking medium, such as oil, in response to an increase or decrease in heat as compared with controlling the temperature of a gas environment (for example, the air in the barbeque enclosure described above). This lag may make it more difficult to safely and accurately maintain the temperature of the fluid within vessel 302 to enable a food product to be safely cooked, while at the same time cooking the food product sufficiently, without overcooking it. The temperature control apparatus 318, as described above, permits the safe, automatic and accurate control of such temperature.

In the present embodiment, the temperature of the cooking medium may be maintained at target temperatures between about 200 degrees Fahrenheit to about 450 Fahrenheit, which is a difficult (or perhaps not possible) level of accuracy when the fuel flow is managed manually. Higher and lower temperatures may be managed depending upon the application. The temperature control apparatus 318 may also be provided with pre-determined safety set-points to prevent the temperature of the vessel 302 to exceed a pre-determined temperature.

As with the other embodiments, the temperature control apparatus 318 may be powered by any convenient power source such as battery, thermoelectric, household current, etc. If power is lost, or batter power is low, then the temperature control apparatus may sound a warning, and may shut down. Preferably, valve 328 enters an off state when power is lost or low.

As described for the other embodiments, temperature control apparatus 318 may be provided with analog or digital inputs, such as a rotatable knob, key pad, or touch screen (e.g., screen 332). Other suitable inputs may also be employed. Similarly, control knobs (such as knobs 30) may be eliminated providing fully automatic control by the temperature control apparatus alone.

Temperature control apparatus 318 may be provided with a mount the nature of a bracket 322 for securing temperature control apparatus 318 to a rigid portion 324 of conduit 316. It is not necessary that a ridged portion 324 be provided. Temperature control apparatus 318 may be mounted to some other structure, such as fuel source 314 or some other structure. Apparatus 318 may be connected to valve 328 via at least one wire 330 for transmitting a signal to valve 328 for it to operate.

As suggested above, employing longer wires 330 (an conduit 316 and thermocouple 320) may permit apparatus 318 to be mounted at a safe or convenient distance from vessel 302 (or other components) for control of the temperature of the fryer 300.

Temperature control apparatus 318 may also be provided with a meat probe, as described above. The meat probe may be placed adjacent to or within a food product to be cooked within vessel 302. When the food product achieves the desired temperature set-point, temperature control apparatus 318 may be used to stop the flow of fuel automatically, or to maintain a warming temperature. A notification may then be activated indicating that the food product is cooked.

A tipping sensor (not shown) such as an electronically (or mechanically) activated level may be mechanically or electrically connected to the temperature control apparatus 318. If vessel 302 is not level, or becomes not level, temperature control apparatus 318 may shut off or vary fuel flow. This may be required, for example, if vessel 302 tips over, or is not placed on a level surface.

Similarly, a fluid overflow sensor (not shown) such as an electronically (or mechanically) activated level may be mechanically or electrically connected to the temperature control apparatus 318. If a fluid within vessel 302 comes into contact with the sensor (e.g., if vessel 302 is over filled, the fluid increases in volume due to boiling or overheating, or overflows), temperature control apparatus 318 may shut off or vary fuel flow. The overflow sensor may be a second thermocouple activated by temperature, or is may be some other sensor such as a sensor sensitive to fluids. The overflow sensor may be placed within vessel 302 (e.g., adjacent the top), or on a side of vessel 302. The sensor may even be placed adjacent vessel 302 (e.g., on an adjacent surface), though such placement may be less likely to come into contact with an overflowing fluid.

Other embodiments of the invention may be employed for safely or desirably automatically controlling the flow of a fuel to achieve a desired temperature set-point or range of set-points. For example, a gas fuelled patio heater may be controlled by the temperature control apparatus 318. In this embodiment (not shown), the temperature control apparatus 318 may be arranged with a fuel source, thermocouple 320 and heater in a similar manner to that described for the fryer 300. In the embodiment for a patio heater, the thermocouple may be placed adjacent the heater, but may also be conveniently placed near a human or other organism for which the heat from the heater is intended. For example, the thermocouple may be placed on a table, and a temperature set-point may be entered into the temperature control apparatus 318. The heater may then be maintained so that it outputs sufficient energy that ambient temperature about the thermocouple is maintained at or about the set-point temperature. A wireless thermocouple and/or temperature control apparatus 318 may be conveniently employed as well. Suitable warnings may also be employed, for example, if a particular set-point is not reachable after a certain period of time. Similarly, a sudden drop or increase in temperature may suggest a problem with the heater and all fuel flow may be shutoff by the temperature control apparatus 318.

In addition, or alternatively, the input to thermocouple 318 may be achieved wirelessly. For example, a temperature set-point may be wirelessly input, and the set-point may then be wirelessly transmitted to the temperature control device 318. In the present embodiment, as a user becomes too hot or too cold, the temperature set-point may be adjusted at a distance from the temperature control apparatus 318 and/or heater.

A similar arrangement may be employed for (indoor or outdoor) fireplaces, fire pits, fire bowels, and other sources of heat, whether the sources of heat are for any use, including warmth and/or cooking. For example, a removable thermocouple for the embodiment relating to a barbeque, may be used so that the barbeque may enjoy a dual use: one for cooking and, once cooking is complete (during cooking, or independently), the thermocouple may be removed and the barbeque may be used as a heater. The thermocouple may be placed near a user, and a temperature set-point entered. The barbeque may then be controlled by the temperature control apparatus 318 until the thermocouple reaches the desired temperature.

While the foregoing embodiments have been described in some detail for purposes of clarity and understanding, it will be appreciated by one skilled in the art, that numerous modifications, variations, and adaptations may be made to the particular embodiments described above without departing from the scope of the invention(s), which is defined in the following claims. In particular, many of the embodiments disclosed may be applied to other gas fueled devices and appliances with appropriate modification.

What is claimed is:

1. A cooking apparatus, comprising:
   a vessel having an internal surface for containing a liquid;
   a safety device for controlling the rate of flow of a flammable fluid received from a regulator at generally constant pressure, the safety device including:
     a flow control apparatus, free of a pressure regulator mechanism, for affecting the flow of the fluid, the flow control apparatus being operable between at least a first non-zero flow rate and a second higher flow rate, and having at least one upstream opening and at least one downstream opening;
     a first burner in fluid communication with the downstream opening of the flow control apparatus, the burner being located for imparting energy to the vessel adjacent an external surface of the vessel;
     a conduit in fluid communication at one end thereof with the upstream opening of the flow control apparatus, and configured at the other end thereof for connection to a fuel supply;
     a thermocouple, located in the vicinity of the vessel, for converting a sensed thermal state into an electrical signal;
     an electronic controller in communication with the flow control apparatus for activating said flow control apparatus to one of said first and second flow rates, and being in communication with the thermocouple for receiving the electrical signal from the thermocouple;
     a microprocessor for controlling operation of the electronic controller including determining between manual and automatic modes of operating the flow control apparatus; and
     an interface connected to the controller for manually inputting a desired temperature, wherein the controller is operable to automatically cycle said flow control apparatus between said first and second flow rates until the temperature sensed by the thermocouple is similar to the desired temperature; and
     the safety control device is free of a pressure regulator between an upstream end of the conduit and the burner.

2. The apparatus of claim 1, further comprising a level sensor mounted to the vessel and electronically connected to the controller, the controller being configured to vary fuel flow when the level sensor indicates that the vessel is not level.

3. The apparatus of claim 1, wherein the vessel is a fryer for containing liquid oil, and the thermocouple is located for placement within the oil during cooking.

4. The apparatus of claim 1, wherein the vessel is a steamer for containing a water based liquid, and the thermocouple is located for placement within one of water and steam inside the vessel during cooking.

5. The apparatus of claim 1, wherein at least one of the thermocouple and interface are wirelessly connected to the controller to permit operation of the safety device at a distance from the vessel.

6. The apparatus of claim 1, wherein the controller is configured to vary the flow of the fluid upon one of the following events occurring: (i) the thermocouple communicating a rapid increase in temperature; (ii) the thermocouple communicating a temperature higher than a pre-determined safe temperature; (iii) the thermocouple communicating a temperature lower than a pre-determined temperature; (iv) the thermocouple communicating a rapid decrease in temperature.

7. The apparatus of claim 1, further comprising an overflow sensor mounted to the vessel and electronically connected to the controller, the controller being configured to vary fuel flow when the overflow sensor indicates that a liquid within the vessel has contacted the sensor.

8. The apparatus of claim 7, wherein the overflow sensor is a second thermocouple and is located adjacent the top of the vessel.

9. A heater for imparting energy to a vessel, the vessel having an internal surface for containing a liquid, the heater comprising:
   a support stand for a burner;
   a system for controlling the rate of flow of a flammable fluid received from a regulator at generally constant pressure, the system including:
     a flow control apparatus, free of a pressure regulator mechanism, for affecting the flow of the fluid, the flow control apparatus being operable between at least a first non-zero flow rate and a second higher flow rate, and having at least one upstream opening and at least one downstream opening;
     a first burner mounted to the support stand, the burner being in fluid communication with the downstream opening of the flow control apparatus, the burner being located for imparting energy to the vessel and for location adjacent an external surface of the vessel;
     a conduit in fluid communication at one end thereof with the upstream opening of the flow control apparatus, and configured at the other end thereof for connection to a fuel supply;
     a thermocouple, located in the vicinity of the vessel, for converting a sensed thermal state into an electrical signal;
     an electronic controller in communication with the flow control apparatus for activating said flow control apparatus to one of said first and second flow rates, and being in communication with the thermocouple for receiving the electrical signal from the thermocouple;
     a microprocessor for controlling operation of the electronic controller including determining between manual and automatic modes of operating the flow control apparatus; and an interface connected to the controller for manually inputting a desired temperature, wherein the controller is operable to automatically cycle said flow control apparatus between said first and second flow rates until the temperature sensed by the thermocouple is similar to the desired temperature; and the flow control system is free of a pressure regulator between an upstream end of the conduit and the burner.

10. A gas fueled fireplace, comprising:

a fire containment structure;

a system for controlling the rate of flow of a flammable fluid received from a regulator at generally constant pressure, the system including:

a flow control apparatus, free of a pressure regulator mechanism, for affecting the flow of the fluid, the flow control apparatus being operable between at least a first non-zero flow rate and a second higher flow rate, and having at least one upstream opening and at least one downstream opening;

a first burner mounted to the containment structure, the burner being in fluid communication with the downstream opening of the flow control apparatus, the burner being located for imparting energy to the vessel;

a conduit in fluid communication at one end thereof with the upstream opening of the flow control apparatus, and configured at the other end thereof for connection to a fuel supply;

a thermocouple, located in the vicinity of the vessel, for converting a sensed thermal state into an electrical signal;

an electronic controller in communication with the flow control apparatus for activating said flow control apparatus to one of said first and second flow rates, and being in communication with the thermocouple for receiving the electrical signal from the thermocouple, the electronic controller having both automatic and manual modes for controlling the burner;

a microprocessor for controlling operation of the electronic controller including determining between manual and automatic modes of operating the flow control apparatus; and an interface connected to the controller for manually inputting a desired temperature, wherein the controller is operable to automatically cycle said flow control apparatus between said first and second flow rates until the temperature sensed by the thermocouple is similar to the desired temperature; and the flow control system is free of a pressure regulator between an upstream end of the conduit and the burner.

* * * * *